(12) United States Patent
Fujikawa et al.

(10) Patent No.: US 8,164,718 B2
(45) Date of Patent: Apr. 24, 2012

(54) LIQUID CRYSTAL DISPLAY DEVICE

(75) Inventors: Saishi Fujikawa, Kanagawa (JP);
Hajime Kimura, Kanagawa (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 942 days.

(21) Appl. No.: 11/955,602

(22) Filed: Dec. 13, 2007

(65) Prior Publication Data
US 2008/0151151 A1    Jun. 26, 2008

(30) Foreign Application Priority Data

Dec. 26, 2006  (JP) ................................. 2006-350137

(51) Int. Cl.
*G02F 1/1333* (2006.01)
(52) U.S. Cl. ...................................................... 349/110
(58) Field of Classification Search .................. 349/110, 349/111
See application file for complete search history.

(56) References Cited

U.S. PATENT DOCUMENTS

| | | | |
|---|---|---|---|
| 5,585,951 A | 12/1996 | Noda et al. | |
| 6,856,360 B1 | 2/2005 | Higuchi et al. | |
| 7,339,647 B2 * | 3/2008 | Youn et al. | 349/153 |
| 2002/0000613 A1 | 1/2002 | Ohtani et al. | |
| 2002/0008818 A1 | 1/2002 | Shiota | |
| 2002/0071072 A1 * | 6/2002 | Ohtani et al. | 349/110 |
| 2002/0085149 A1 * | 7/2002 | Kim et al. | 349/110 |
| 2003/0231267 A1 * | 12/2003 | Murai et al. | 349/113 |
| 2004/0012726 A1 | 1/2004 | Kano et al. | |
| 2007/0177081 A1 | 8/2007 | Tanaka et al. | |

FOREIGN PATENT DOCUMENTS

| | | |
|---|---|---|
| JP | 06-242433 | 9/1994 |
| JP | 11-160735 | 6/1999 |
| JP | 11-163364 | 6/1999 |
| JP | 11-202368 | 7/1999 |
| JP | 2001-305576 | 10/2001 |
| JP | 2007-206135 | 8/2007 |

* cited by examiner

*Primary Examiner* — Richard Kim
(74) *Attorney, Agent, or Firm* — Nixon Peabody LLP; Jeffrey L. Costellia

(57) ABSTRACT

To provide a liquid crystal display device having high visibility and high image quality by relieving color phase irregularity. A light-shielding layer is selectively provided so as to overlap with a contact hole for electrical connection to a source region or a drain region of a thin film transistor. Alternatively, by providing an opening portion of a colored layer (color filter) with an opening so as to overlap with a contact hole, uneven alignment of liquid crystal molecules does not influence display, and a liquid crystal display having high image quality can be provided.

45 Claims, 15 Drawing Sheets

LIQUID CRYSTAL DISPLAY DEVICE

BACKGROUND OF THE INVENTION

1. Field of the Invention

The present invention relates to an active matrix liquid crystal display device.

2. Description of the Related Art

Conventionally, an active matrix liquid crystal display device with an active element such as a thin film transistor (TFT) has been known. Since an active matrix liquid crystal display device can have higher pixel density as well as be small in size and low in weight and power consumption, products such as a monitor for a personal computer, a liquid crystal television, and a monitor for a car navigation system have been developed as one of flat panel displays in substitution for a CRT.

In a liquid crystal display device, display is conducted as follows: a substrate (an active matrix substrate), which is provided with a pixel portion including a first electrode (a pixel electrode) and the like in addition to a plurality of thin film transistors (TFT) and a wiring, and a substrate (a counter substrate), which is provided with a second electrode (a counter electrode), a light-shielding layer (a black matrix), a colored layer (a color filter), and the like, are attached to each other; a space between these substrates is filled with a liquid crystal and sealed; and liquid crystal molecules are aligned by an electric field which is applied between the pixel electrode and the counter electrode to control the amount of light from a light source.

When a liquid crystal display device displays an image, high-definition image display cannot be performed with uneven alignment of liquid crystal molecules. In order to evenly align liquid crystal molecules, a distance (cell gap) between a pixel electrode and a counter electrode is necessary to be the same (planarized). For example, as a method thereof, there is a method of forming an insulating film as a planarizing film by an application method or the like (Reference 1; Japanese Published Patent Application No. 2001-305576). An organic film described in Reference 1 is an organic insulating film for planarization, and it is an acrylic transparent organic film. As diagrams and the like show, when an organic film is used, a contact hole gets deep due to the thick thickness of the organic film.

SUMMARY OF THE INVENTION

As shown in Reference 1, the thickness of an interlayer film for planarization is comparatively thick. With an interlayer with thick thickness, a contact hole for formation of a wiring which electrically connects a pixel electrode and a thin film transistor becomes deep. When the contact hole becomes deep, distance (cell gap) between the pixel electrode and the counter electrode also becomes long. Accordingly, a spot where a contact hole is formed is thickened by the thickness of the interlayer. Therefore, the spot where the contact hole is formed and a spot where the contact hole is not formed are very different in the thickness of a liquid crystal layer; that is, uneven alignment of liquid crystal molecules can easily occur around the spot where the contact hole is formed. Particularly, alignment of the liquid crystal molecules becomes uneven the most because the interlayer is slanted in the edge of the contact hole. Uneven alignment of the liquid crystal molecules causes color phase irregularity of the liquid crystal display.

An object of the present invention is to provide a liquid crystal display device having a high visibility and a high image quality by relieving color phase irregularity.

In addition, another object of the present invention is to provide a liquid crystal display device having a high aperture ratio and a high image quality and by relieving color phase irregularity.

A liquid crystal display device of the present invention includes a thin film transistor; a conductive layer electrically connected to the thin film transistor; an insulating film having a contact hole and provided over the conductive layer; a pixel electrode provided over the conductive layer and the insulating film having the contact hole, and electrically connected to the conductive layer through the contact hole; and a light-shielding layer formed in a region overlapping with at least the edge of the contact hole.

A liquid crystal display device of the present invention includes a thin film transistor; a conductive layer electrically connected to the thin film transistor; an insulating film having a contact hole and formed over the conductive layer; a pixel electrode provided over the conductive layer and the insulating film having the contact hole, and electrically connected to the conductive layer through the contact hole; and a colored layer having an opening portion. The opening portion of the colored layer is provided in a region overlapping with at least the edge of the contact hole.

A liquid crystal display device of the present invention includes a thin film transistor; a conductive layer electrically connected to the thin film transistor, an insulating film including a contact hole and provided over the conductive Layer; a pixel electrode provided over the conductive layer and the insulating film having the contact hole, and electrically connected to the conductive layer through the contact hole; a colored layer having an opening portion; and a light-shielding layer provided in a region overlapping with at least the edge of the contact hole. The opening portion of the colored layer is provided in a region overlapping with at least the edge of the contact hole.

In the above structure, the light-shielding layer is a metal film having a light-shielding property or a resin film in which pigment or dye is dispersed.

In the above structure, the insulating film is a resin film.

In a liquid crystal display device of the present invention, a portion in which alignment of liquid crystal molecules is uneven does not function as a display portion.

In a liquid crystal display device of the present invention, a light-shielding layer is selectively formed so as to cover a contact hole and a display without color phase irregularity can be provided.

In a liquid crystal display device of the present invention, a color filter is selectively removed so as to prevent uneven alignment of liquid crystal molecules around the contact hole from influencing display and a display without color phase irregularity can be provided.

DETAILED DESCRIPTION OF THE INVENTION

Figure 1A:
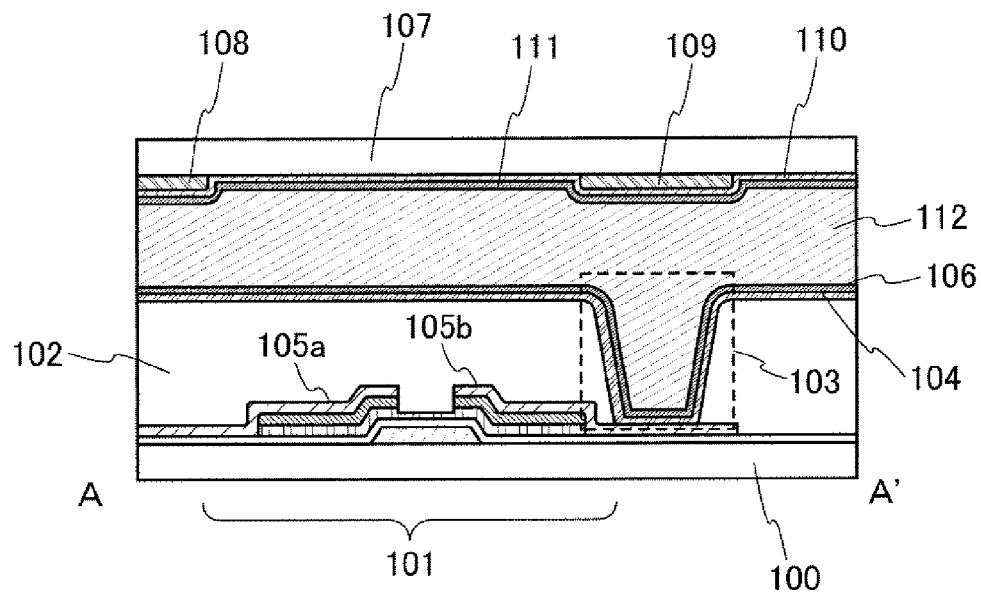
FIGS. 1A and 1B are diagrams illustrating Embodiment Mode 2.

Hereinafter, one mode of the present invention will be precisely described with reference to the accompanying drawings and the like. However, the present invention can be carried out in many different modes and it is easily understood by those skilled in the art that various changes in that modes and detail will be possible unless such changes depart from the purpose of the invention. Therefore, the present invention is not construed as being limited to description of the embodiment modes.

Embodiment Mode 1

In this embodiment mode, a structure of a liquid crystal display device using the present invention will be described.

Methods by which a portion, where liquid crystal molecules are unevenly aligned, is prevented from functioning as a display portion are largely classified into two types: one is a method of providing a light-shielding layer so as to cover the portion where the liquid crystal molecules are unevenly aligned; and another is a method of not providing a color filter over the portion where the liquid crystal molecules are unevenly aligned.

As a structure of providing a light-shielding layer so as to cover the portion where the liquid crystal molecules are unevenly aligned, there is a round shape or a doughnut shape. The round shape is a structure in which a whole contact hole is covered whereas the doughnut shape is a structure in which a portion except the center portion of the contact hole is covered with the light-shielding layer. The doughnut shape preferably covers at least the edge of the contact hole. Note that the edge of the contact hole is a region where an insulating film of the contact hole is slanted.

In the case where the light-shielding layer has the round shape which covers the whole contact hole, the entire portion where the liquid crystal molecules are unevenly aligned is covered. By employing this structure, a display having a high aperture ratio and having no color phase irregularity can be manufactured. In addition, this round-shaped light-shielding layer can be formed in the same process in which a light-shielding layer is formed at a wiring portion. Therefore, the number of processes does not increase and a complicated process is not necessary.

In the case where the light-shielding layer has the doughnut shape, since the edge of the contact hole, that is, the region in the contact hole where the insulating film is slanted, is covered so that uneven alignment around the edge of the contact hole where alignment of the liquid crystal molecules is most likely to get uneven can be covered. Since the thickness of the liquid crystal layer does not vary drastically in the portion besides the edge of the contact hole, it can be considered that alignment of the liquid crystal molecules does not become uneven at that portion. By employing the doughnut shape, a display having a high aperture ratio and having no color phase irregularity can be manufactured. In addition, this doughnut-shaped light-shielding layer can be formed in the same process in which a light-shielding layer is formed at a wiring portion. Therefore, the number of processes does not increase and a complicated process is not necessary. Note that in this specification, although the shape of the light-shielding layer is called "round shape" or "doughnut shape," the shape of the light-shielding layer can be appropriately changed depending on a shape of the contact hole. That is, any shape can be possible as long as the light-shielding layer covers the contact hole; for example, a circular shape, an oval shape, a square shape, a rectangular shape, a triangular shape, or the like is given.

A structure of not providing a color filter to the portion where alignment of the liquid crystal molecules is uneven includes the round shape or the doughnut shape. The round shape is a structure of not providing a color filter above the whole contact hole whereas the doughnut shape is a structure of not providing a color filter above a region where an insulating film of the contact hole is slanted.

In the case where the round shape is removed from the color filter, the whole contact hole is not covered by the color filter. Therefore, the thickness of the liquid crystal layer is very different and the portion where alignment of the liquid crystal molecules is uneven does not influence display. By employing this structure, a display having a high aperture ratio and having no color phase irregularity can be provided. In addition, in the structure in which the round shape is removed from the color filter, the number of processes does not increase and a complicated process is not necessary.

In the case where the doughnut shape is removed from the color filter, the edge of the contact hole, that is, the slanted region of the insulating film in the contact hole is removed. Since the thickness of the liquid crystal layer does not have a big difference in a portion besides the edge of the contact hole, it is to be considered that uneven alignment of the liquid crystal molecules can be prevented at that portion. By employing the doughnut shape, a display having a high aperture ratio and having no color phase irregularity can be provided. In addition, this structure in which the doughnut shape is removed from the color filter, the number of processes does not increase and a complicated process is not necessary. In this specification, although a shape of the color filter is called "round shape" or "doughnut shape," the shape of the color filter can be appropriately changed depending on the shape of the contact hole. That is, any shape is possible as long as a region in the color filter which overlaps with the contact hole is removed; for example, a circular shape, an oval shape, a square shape, a rectangular shape, a triangular shape, or the like is given.

Embodiment Mode 2

In this embodiment mode, a liquid crystal display device in which a light-shielding layer is selectively formed will be described with reference to FIGS. 1A to 2B.

Figure 1B:
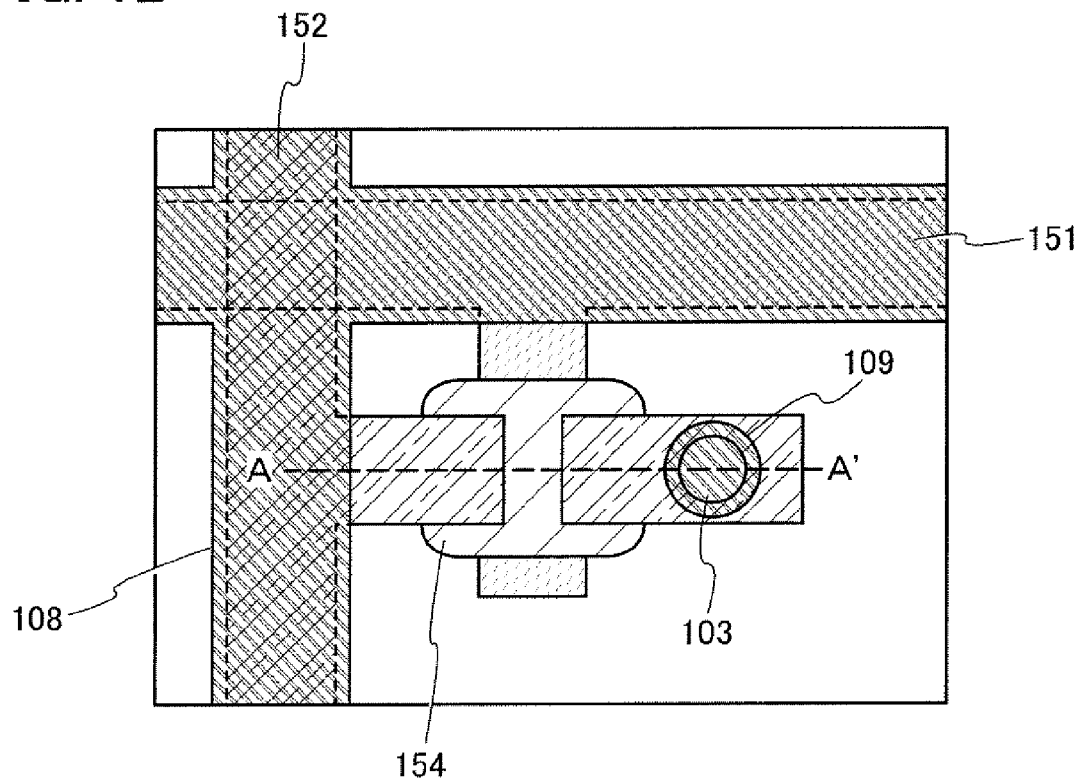

FIG. 1B is a top-view of a liquid crystal display device using the present invention which is seen from a counter substrate side. Over an active matrix substrate, a thin film transistor, a wiring layer which is electrically connected to the thin film transistor, an insulating film, a pixel electrode, an alignment film, and the like are formed. On the counter substrate which is to be attached to the active matrix substrate, a light-shielding layer, a counter electrode, an alignment film, and the like are formed. In FIG. 1B, only a gate line 151, a source line 152, a contact hole 103, a semiconductor layer 154 of a thin film transistor, a first light-shielding layer 108, and a second light-shielding layer 109 are illustrated and other elements are omitted.

As shown in FIG. 1B, as the light-shielding layer, the first light-shielding layer 108 is formed in a region corresponding to the gate line 151 and the source line 152; and the second light-shielding layer 109 is formed in a region corresponding to the contact hole 103 in a source region or a drain region of the thin film transistor.

FIG. 1A is an enlarged cross-sectional view of the contact hole along a line A-A' in FIG. 1B. A structure of the active matrix substrate in this embodiment mode will be described below.

A thin film transistor 101 is formed over a substrate 100. As the substrate 100, a glass substrate made of aluminoborosilicate glass, barium borosilicate glass, quartz glass, or the like; a substrate formed with a synthetic resin typified by acrylic or plastic, typically PET (polyethylene terephthalate), PEN (polyethylene naphthalate), PES (polyethersulfone), polypropylene, or the like can be used. Although FIG. 1A illustrates a channel-etched transistor, the thin film transistor 101 can be any of a top-gate type, a bottom-gate type, a channel-etched type, and a channel-protective type.

An insulating film 102 is formed over the thin film transistor 101 and the contact hole 103 is formed for electrical connection with the thin film transistor 101. The insulating film 102 can be formed by using an organic resin film, an inorganic insulating film, or an insulating film including a Si—O—Si bond formed by using a siloxane-based material as a starting material (a siloxane-based insulating film). Here, the siloxane has a main chain including a bond of silicon (Si) and oxygen (O), and an organic group containing at least hydrogen (for example, an alkyl group or aryl group) is used for a substituent. A substituent also includes a fluoro group. Further, the organic group containing at least hydrogen and the fluoro group can be used for the substituent. Furthermore, a low-dielectric material can be used for the insulating film.

Note that the contact hole 103 can be formed to be perpendicular to the substrate. However, in order to improve step coverage in forming a pixel electrode 104 in a later step, the contact hole 103 is preferably formed so that its edge is slanted as shown in FIG. 1A. Therefore, in this specification, a contact hole has a slanted portion which is denoted as the edge of the contact hole.

The pixel electrode 104 is formed so as to cover the thin film transistor 101 and the insulating film 102. The pixel electrode 104 is electrically connected to a drain electrode 105*b* in the exposed thin film transistor 101.

In the case of manufacturing a reflective liquid crystal display device, a reflective metal can be used for the pixel electrode 104. In the case of manufacturing a transmissive liquid crystal display device, indium tin oxide (ITO) in which tin oxide is mixed into indium oxide, indium tin silicon oxide (ITSO) in which silicon oxide is mixed into indium tin oxide (ITO), indium zinc oxide (IZO) in which zinc oxide is mixed into indium oxide, zinc oxide (ZnO), tin oxide ($SnO_2$), or the like can be used. In the case of manufacturing a semi-transmissive liquid crystal display device, a reflective metal is used for a pixel electrode in a reflective region; and for a transmissive region, a transmissive material is used (for example, indium tin oxide (ITO) in which tin oxide is mixed into indium oxide, indium tin silicon oxide (ITSO) in which silicon oxide is mixed into indium tin oxide (ITO), indium zinc oxide (IZO) in which zinc oxide is mixed into indium oxide, zinc oxide (ZnO), tin oxide ($SnO_2$), or the like).

An alignment film 106 is formed over the pixel electrode 104. As the alignment film 106, a polyimide resin or the like can be used.

Next, a structure of the counter substrate in this embodiment mode will be described.

The first light-shielding layer 108 and the second light-shielding layer 109 are formed to be in contact with a substrate 107. The first light-shielding layer 108 is formed so as to cover a source wiring and to cover part of a source electrode 105*a*. The second light-shielding layer 109 is formed so as to correspond to the contact hole 103. As the substrate 107, a glass substrate made of aluminoborosilicate glass, barium borosilicate glass, quartz glass, or the like; a substrate formed with a synthetic resin typified by acrylic or plastic, typically PET (polyethylene terephthalate), PEN (polyethylene naphthalate), PES (polyethersulfone), polypropylene, or the like can be used. As the first light-shielding layer 108 and the second light-shielding layer 109, films having a light-shielding property (for example, a single layer film of chromium (Cr), a stacked film of chromium oxide ($Cr_xO_y$) and chromium (Cr), a resin film in which a colorant such as carbon black or dye, or the like is dispersed) can be used As shown in FIG. 1B, as the light-shielding layer, the first light-shielding layer 108 is formed in a region corresponding to the gate line 151 and the source line 152 over the active matrix substrate; and the second light-shielding layer 109 is formed in a region corresponding to the contact hole 103 in a source region or a drain region over the active matrix substrate. The region corresponding to the contact hole 103 is a region which overlaps with the contact hole 103.

The second light-shielding layer 109 is formed in the region corresponding to the contact hole 103 over the active matrix substrate, separately from the first light-shielding layer 108 formed in the region corresponding to the gate line 151 and the source line 152. Therefore, since the region where the second light-shielding layer 109 is formed does not function as a display portion, even if liquid crystal molecules are unevenly aligned in the layer over the contact hole, a display device having high contrast, high image quality, and having no color phase irregularity can be manufactured.

Although the first light-shielding layer 108 is provided above the gate line 151 and the source line 152, the whole thin film transistor is not covered. By employing such structure, decrease in an aperture ratio can be suppressed to a minimum.

By separately forming the light-shielding layers as the first light-shielding layer 108 and the second light-shielding layer 109, decrease in the aperture ratio can be suppressed to a minimum and a display device having high contrast, high image quality, and having no color phase irregularity can be manufactured.

The shape of the second light-shielding layer 109 can be anything as long as the second light-shielding layer 109 is provided in a region corresponding to the contact hole 103 in the active matrix substrate. For example, a circular shape, an oval shape, a square shape, a rectangular shape, a triangular shape, or the like is given.

A counter electrode 110 is formed so as to be in contact with the substrate 107, the first light-shielding layer 108, and the second light-shielding layer 109. For the counter electrode 110, indium tin oxide (ITO) in which tin oxide is mixed into indium oxide, indium tin silicon oxide (ITSO) in which silicon oxide is mixed into indium tin oxide (ITO), indium zinc oxide (IZO) in which zinc oxide is mixed into indium oxide, zinc oxide (ZnO), tin oxide (SnO$_2$), or the like can be used.

An alignment film 111 is formed on the counter electrode 110. For the alignment film 111, a polyimide resin or the like can be used.

The active matrix substrate having the above-described structure is attached to the counter substrate to form a liquid crystal layer 112 therebetween. For the liquid crystal, a ferroelectric liquid crystal (FLC), a nematic liquid crystal, a smectic liquid crystal, a liquid crystal which is to be homogeneously aligned, a liquid crystal which is to be homeotropically aligned, or the like can be used.

Figure 7:
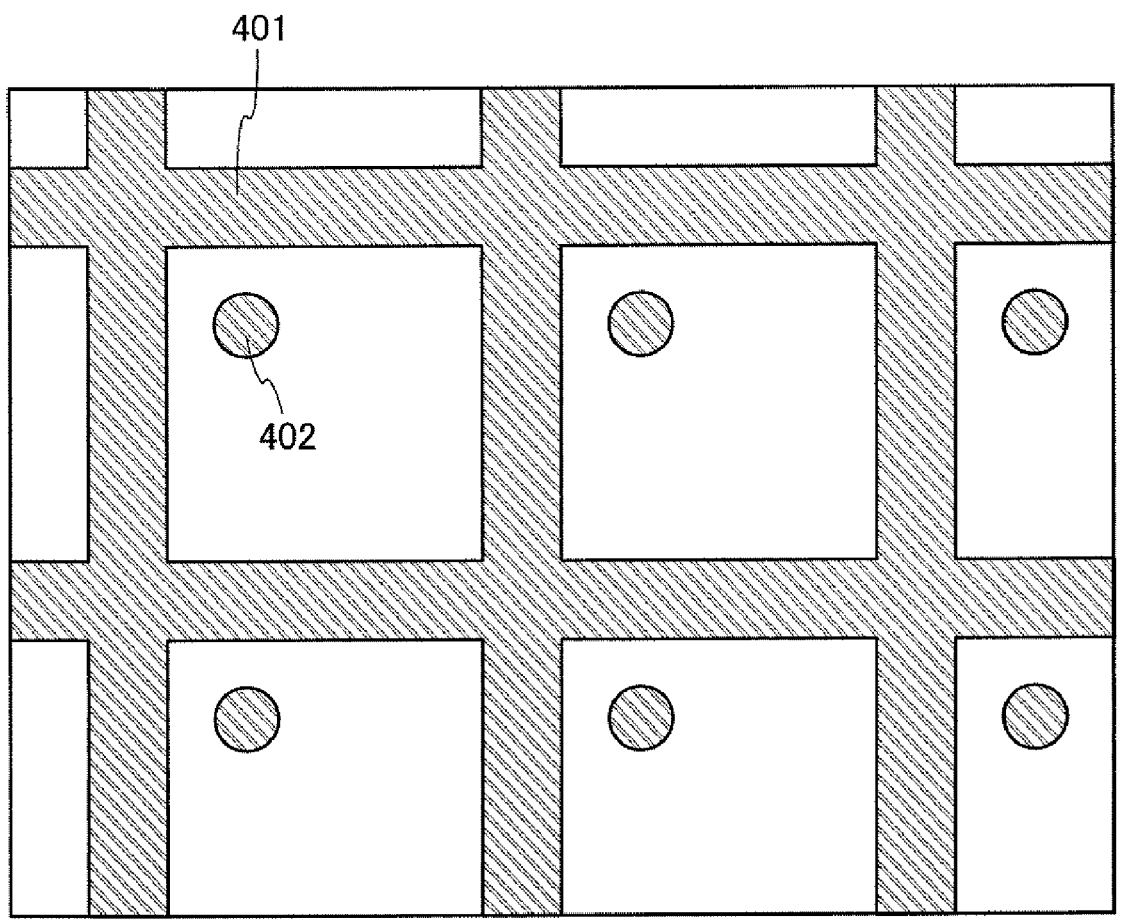
FIG. 7 is a diagram illustrating Embodiment Mode 2.

Note that in the case of employing the structure shown in FIGS. 1A and 1B, a second light-shielding layer 402 is provided separately from a first light-shielding layer 401 as shown in FIG. 7

In addition to the structure shown in FIGS. 1A and 1B, a colored layer (color filter) can be formed on an active matrix substrate side or a counter substrate side. In the case of forming a colored layer (color filter), the colored layer can have a single color or 256 gray-scales.

Figure 9A:
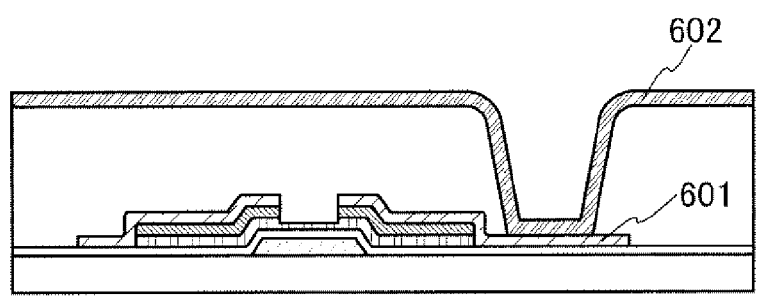
FIGS. 9A to 9D are diagrams illustrating an example of a thin film transistor which is applicable to the present invention.
Figure 9B:
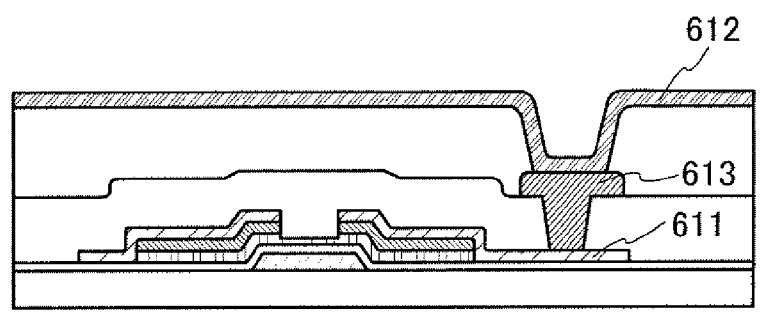

The thin film transistor to be formed over the active matrix substrate can be any of a top-gate type, a bottom-gate type, a channel-etched type, or a channel-protective type. Moreover, a source electrode or a drain electrode of the thin film transistor is not necessary to be directly connected to the pixel electrode. FIG. 9A illustrates the structure shown in FIG. 1A. In FIG. 9A, a pixel electrode 602 is in contact with a source electrode or a drain electrode 601 of a channel-etched thin film transistor. FIG. 9B illustrates a structure in which a source electrode or a drain electrode 611 of the channel-etched thin film transistor shown in FIG. 9A is electrically connected to a pixel electrode 612 through a conductive film 613.

Figure 9C:
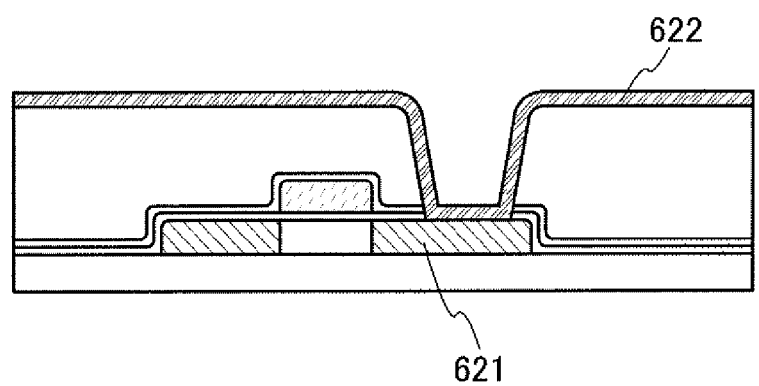
Figure 9D:
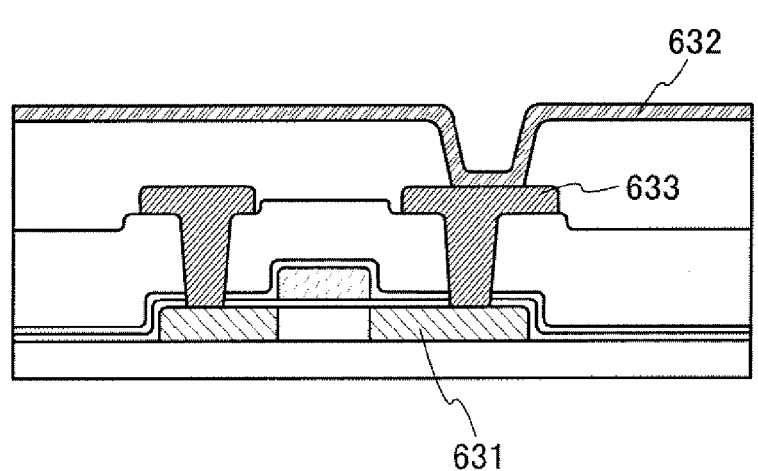

FIG. 9C illustrates a top-gate thin film transistor in which a source region or a drain region 621 of the thin film transistor is in contact with a pixel electrode 622. FIG. 9D illustrates a structure in which a source region or a drain region 631 of the top-gate thin film transistor shown in FIG. 9C is electrically connected to a pixel electrode 632 through a conductive film 633.

The thin film transistor shown in FIGS. 9A to 9D is an example. In this embodiment mode, the thin film transistor formed over the glass substrate is shown but a thin film transistor that can be used in the present invention is not limited thereto; a transistor using a silicon wafer is possible.

By employing the structure shown in FIGS. 1A and 1B, uneven alignment of the liquid crystal molecules above the contact hole 103 does not influence image display and a display without color phase irregularity can be manufactured. Moreover, the second light-shielding layer 109 is selectively formed to suppress a decrease in an aperture ratio. Since the structure can be formed in the same steps and process in which the first light-shielding layer 108 is formed in the region corresponding to the gate line 151 and the source line 152 over the active matrix substrate, the number of steps does not increase and a complicated process is not necessary.

A light-shielding layer can be provided in a region corresponding to a slanted portion in the insulating film 102 of the contact hole 103, that is, a region overlapping with the edge of the contact hole. This is because alignment of the liquid crystal molecules is most likely to get uneven around the slanted region of the insulating film 102 (the edge of the contact hole).

Figure 2A:
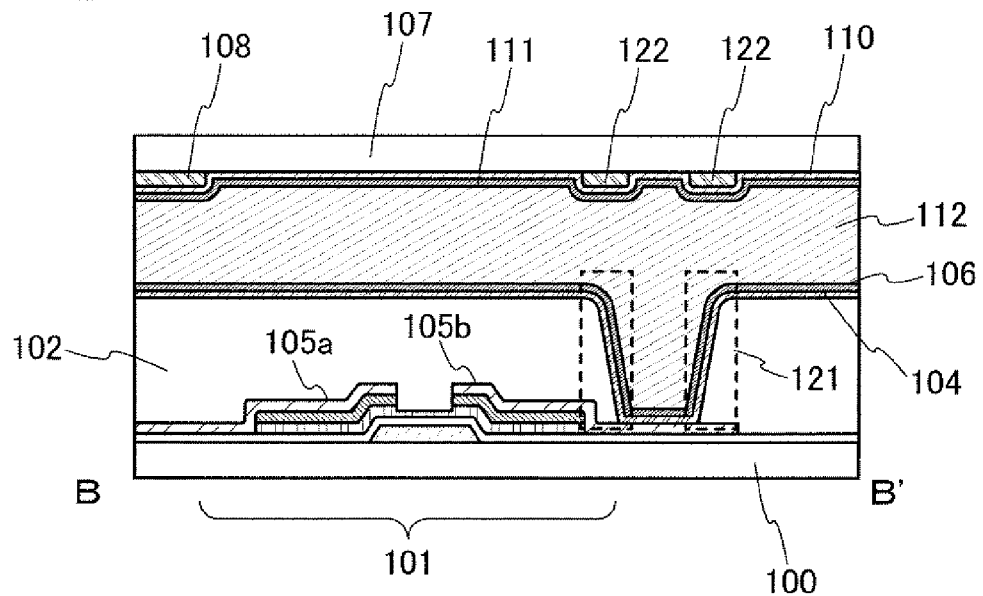
FIGS. 2A and 2B are diagrams illustrating Embodiment Mode 2.
Figure 2B:
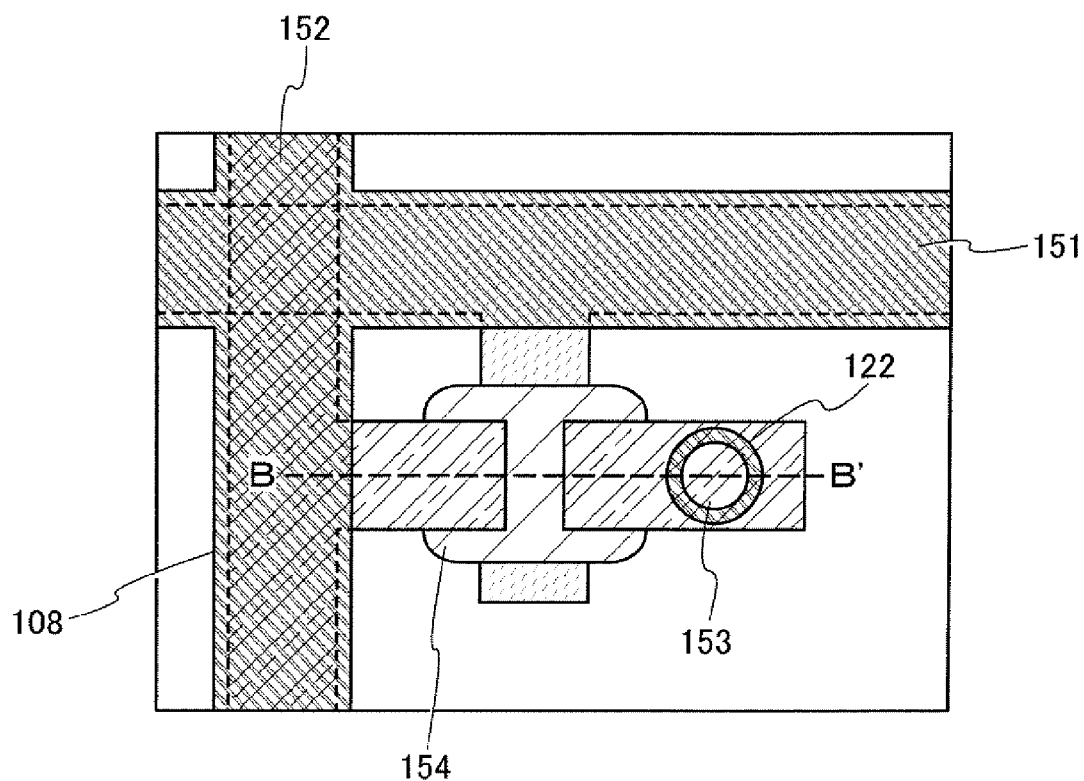

FIG. 2B illustrates a top-view of a liquid crystal display device using the present invention seen from a counter substrate side. This diagram differs from FIG. 1B in that the second light-shielding layer 122 does not have a round shape but a doughnut shape. An active matrix substrate is a substrate over which a thin film transistor, a wiring layer electrically connected to the thin film transistor, an insulating film, a pixel electrode, an alignment film, and the like are formed. A counter substrate to be attached to the active matrix substrate is a substrate on which a light-shielding layer, a counter electrode, an alignment film, and the like are formed. In FIG. 2B, only a gate line 151, a source line 152, a contact hole 153, a semiconductor layer 154 of the thin film transistor, a first light-shielding layer 108, and a second light-shielding layer 122 are illustrated and other elements are omitted. It is to be noted that the same portions as those described in FIG. 1B are denoted by the same reference numerals.

As shown in FIG. 2B, as the light-shielding layer, the first light-shielding layer 108 is formed in the region corresponding to the gate line 151 and the source line 152; and the second light-shielding layer 122 is formed in a region corresponding to a slanted portion 121 in the insulating film of the contact hole 153 which is formed in a source region or a drain region of the thin film transistor. The region corresponding to the slanted portion 121 of the insulating film of the contact hole 153 is a region overlapping with the edge of the contact hole 153.

FIG. 2A is an enlarged cross-sectional view of the contact hole along a line B-B' in FIG. 2B. Since the structure of the active matrix substrate is the same as shown in FIGS. 1A and 1B, description thereof is omitted here. It is to be noted that the same portions as those described in FIG. 1A are denoted by the same reference numerals.

A structure of the counter substrate will be described below. The first light-shielding layer 108 and the second light-shielding layer 122 are formed to be in contact with the substrate 107. The second light-shielding layer 122 is formed to correspond to the region corresponding to the slanted portion 121 of the insulating film 102 which is formed over the active matrix substrate. The region corresponding to the slanted portion 121 in the insulating film 102 is a region overlapping with the edge of the contact hole.

For the substrate 107, a glass substrate made of aluminoborosilicate glass, barium borosilicate glass, quartz glass, or the like; a substrate formed with a synthetic resin typified by acrylic or plastic, typically PET (polyethylene terephthalate), PEN (polyethylene naphthalate), PES (polyethersulfone), polypropylene, or the like can be used. As the second light-shielding layer 122, a film having a light-shielding property (for example, a single layer film of chromium (Cr), a stacked film of chromium oxide ($Cr_xO_y$) and chromium (Cr), a resin film in which a colorant such as carbon black, dye, or the like is dispersed) can be used.

A counter electrode 110 is formed so as to be in contact with the substrate 107 and the second light-shielding layer 122. For the counter electrode 110, indium tin oxide (ITO) in which tin oxide is mixed into indium oxide, indium tin silicon oxide (ITSO) in which silicon oxide is mixed into indium tin oxide (ITO), indium zinc oxide (IZO) in which zinc oxide is mixed into indium oxide, zinc oxide (ZnO), tin oxide (SnO$_2$), or the Like can be used.

The alignment film 111 is formed on the counter electrode 110. For the alignment film 111, polyimide resin or the like can be used.

The counter substrate having the above-described structure is attached to the active matrix substrate described in FIG. 1A and the liquid crystal is injected therebetween. For the liquid crystal, a ferroelectric liquid crystal (FLC), a nematic liquid crystal, a smectic liquid crystal, a liquid crystal which is to be homogeneously aligned, a liquid crystal which is to be homeotropically aligned, or the like can be used.

In addition to the structure shown in FIGS. 2A and 2B, a colored layer (color filter) can be formed on an active matrix substrate side or a counter substrate side. In the case of forming a colored layer (color filter), the colored layer can have a single color or 256 gray-scales.

The thin film transistor to be formed over the active matrix substrate can be any of a top-gate type, a bottom-gate type, a channel-etched type, or a channel-protective type. Moreover, a source electrode or a drain electrode of the thin film transistor is not necessary to be directly connected to the pixel electrode. The transistor shown in FIGS. 9A to 9D is applicable to FIGS. 2A and 2B as it is with FIGS. 1A and 1B.

By employing the structure shown in FIGS. 2A and 2B, the slanted portion 121 in the insulating film 102 of the contact hole 153, that is, the edge of the contact hole where alignment of the liquid crystal molecules gets uneven does not influence image display and a display without color phase irregularity can be manufactured. Moreover, the second light-shielding layer 122 is selectively formed to suppress a decrease in an aperture ratio. Since the structure can be formed in the same steps and process in which the first light-shielding layer 108 is formed in the region corresponding to the gate line 151 and the source line 152 over the active matrix substrate, the number of steps does not increase and a complicated process is not necessary.

Embodiment Mode 3

In this embodiment mode, a liquid crystal display device from which a colored layer (color filter) is selectively removed will be described with reference to FIGS. 3A to 4B.

Figure 3A:
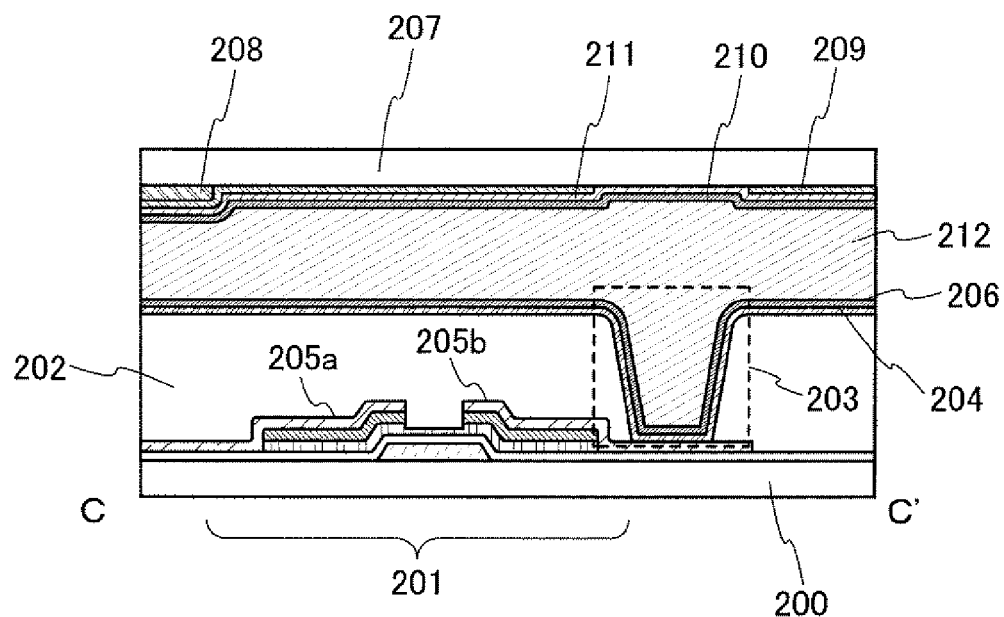
FIGS. 3A and 3B are diagrams illustrating Embodiment Mode 3.
Figure 3B:
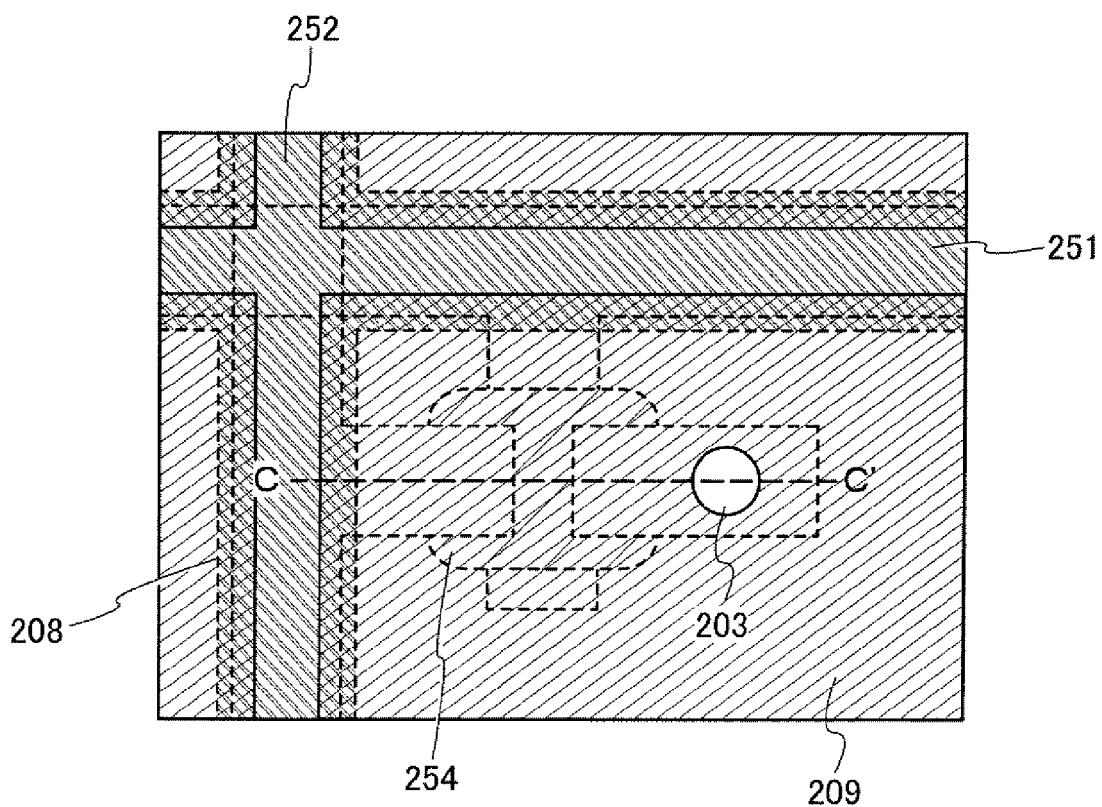

FIG. 3B is a top-view of a liquid crystal display device using the present invention seen from a counter substrate side. An active matrix substrate is a substrate over which a thin film transistor, an insulating film, a pixel electrode, an alignment film, and the like are formed. A counter substrate to be attached to the active matrix substrate is a substrate on which a light-shielding layer, a colored layer, a counter electrode, an alignment film, and the like are formed. In FIG. 3B, only a gate line 251, a source line 252, a contact hole 203, a semiconductor layer 254 of the thin film transistor, a light-shielding layer 208, and a colored layer (color filter) are illustrated and other elements are omitted.

As shown in FIG. 3B, a region corresponding to the contact hole 203 in a source region or a drain region of the thin film transistor over the active matrix substrate is removed from the colored layer (color filter) 209. The region corresponding to the contact hole 203 is a region overlapping with the contact hole 203.

FIG. 3A is an enlarged cross-sectional view of the contact hole along a line C-C' in FIG. 3B. A structure of the active matrix substrate in this embodiment mode will be described below.

A thin film transistor 201 is formed over a substrate 200. For the substrate 200, a glass substrate made of aluminoborosilicate glass, barium borosilicate glass, quartz glass, or the like; a substrate formed with a synthetic resin typified by acrylic or plastic, typically PET (polyethylene terephthalate), PEN (polyethylene naphthalate), PES (polyethersulfone), polypropylene, or the like can be used. Although the thin film transistor 201 can be any of a top-gate type, a bottom-gate type, a channel-etched type, or a channel-protective type, the channel-etched transistor is illustrated in FIG. 3A.

An insulating film 202 is formed over the thin film transistor 201 and then, the contact hole 203 is formed for electrical connection with the thin film transistor 201. The insulating film 202 can be formed by using an organic resin film, an inorganic insulating film, or an insulating film including a Si—O—Si bond formed by using a siloxane-based material as a starting material (a siloxane-based insulating film). Here, the siloxane has a main chain including a bond of silicon (Si) and oxygen (O), and an organic group containing at least hydrogen (for example, an alkyl group or an aryl group) is used for a substituent. A fluoro group can also be used as a substituent. Further, the organic group containing at least hydrogen and the fluoro group can be used for the substituent. Furthermore, a low-dielectric material can be used for the insulating film.

A pixel electrode 204 is formed so as to cover the thin film transistor 201 and the insulating film 202. The pixel electrode 204 is electrically connected to a drain electrode 205b in the exposed thin film transistor 201.

In the case of manufacturing a reflective liquid crystal display device, a reflective metal is used for a pixel electrode 204. In the case of manufacturing a transmissive liquid crystal display device, indium tin oxide (ITO) in which tin oxide is mixed into indium oxide, indium tin silicon oxide (ITSO) in which silicon oxide is mixed into indium tin oxide (ITO), indium zinc oxide (IZO) in which zinc oxide is mixed into indium oxide, zinc oxide (ZnO), tin oxide ($SnO_2$), or the like can be used. In the case of manufacturing a semi-transmissive liquid crystal display device, a reflective metal is used for a pixel electrode in a reflective region; and for a transmissive region, a transmissive material is used (for example, indium tin oxide (ITO) in which tin oxide is mixed into indium oxide, indium tin silicon oxide (ITSO) in which silicon oxide is mixed into indium tin oxide (ITO), indium zinc oxide (IZO) in which zinc oxide is mixed into indium oxide, zinc oxide (ZnO), tin oxide (SnO2), or the like).

An alignment film 206 is formed over the pixel electrode 204. For the alignment film 206, polyimide resin or the like can be used.

Next, a structure of the counter substrate in this embodiment mode will be described below.

The light-shielding layer 208 and the colored layer (color filter) 209 are formed to be in contact with a substrate 207. The colored layer (color filter) is removed in accordance with the contact hole 203 formed in the insulating film 202. For the substrate 207, a glass substrate made of aluminoborosilicate glass, barium borosilicate glass, quartz glass, or the like; a substrate formed with a synthetic resin typified by acrylic or plastic, typically PET (polyethylene terephthalate), PEN (polyethylene naphthalate), PES (polyethersulfone), polypropylene, or the like can be used. The colored layer 209 can have a single color or 256 gray-scales.

A portion to be removed from the colored layer (color filter) can have any shape as long as the portion is within a region corresponding to the contact hole 203 in the active matrix substrate, that is, a region overlapping with the contact hole 203. For example, a circular shape, an oval shape, a square shape, a rectangular shape, a triangular shape, or the like is given.

A counter electrode 210 is formed to be in contact with the substrate 207, the light-shielding layer 208, and the colored layer (color filter) 209. For the counter electrode 210, indium tin oxide (ITO) in which tin oxide is mixed into indium oxide, indium tin silicon oxide (ITSO) in which silicon oxide is mixed into indium tin oxide (ITO), indium zinc oxide (IZO) in which zinc oxide is mixed into indium oxide, zinc oxide (ZnO), tin oxide ($SnO_2$), or the like can be used.

An alignment film 211 is formed on the counter electrode 210. For the alignment film 211, polyimide resin or the like can be used.

The active matrix substrate having the above-described structure is attached to the counter substrate and a liquid crystal layer 212 is formed therebetween. For the liquid crystal, a ferroelectric liquid crystal (FLC), a nematic liquid crystal, a smectic liquid crystal, a liquid crystal which is to be homogeneously aligned, a liquid crystal which is to be homeotropically aligned, or the like can be used.

The thin film transistor to be formed over the active matrix substrate can be any of a top-gate type, a bottom-gate type, a channel-etched type, or a channel-protective type. Moreover, a source electrode or a drain electrode of the thin film transistor is not necessary to be directly connected to the pixel electrode. The transistor shown in FIGS. 9A to 9D is applicable to FIGS. 3A and 3B as it is with FIGS. 1A and 1B.

By employing the structure shown in FIGS. 3A and 3B, since uneven alignment of the liquid crystal molecules above the contact hole 203 does not influence image display, a display without color phase irregularity can be manufactured. Moreover, since the colored layer (color filter) is selectively removed, a decrease in aperture ratio is more suppressed than the case of providing a light-shielding layer. Further, since the structure can be formed in the same steps and process in which an ordinary colored layer is formed, the number of steps does not increase and a complicated process is not necessary.

The colored layer (color filter) in a region corresponding to a slanted portion of the insulating film 202 in the contact hole 203 in the active matrix substrate can be removed. This is because alignment of the liquid crystal molecules is most likely to get uneven around the slanted region of the insulating film 202, that is, the edge of the contact hole.

Figure 4A:
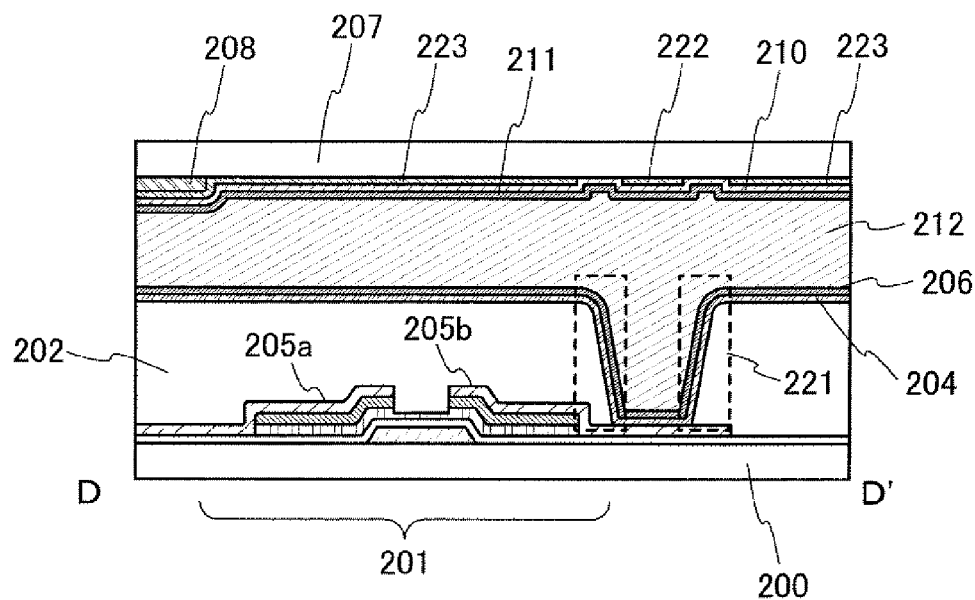
FIGS. 4A and 4B are diagrams illustrating Embodiment Mode 3.
Figure 4B:
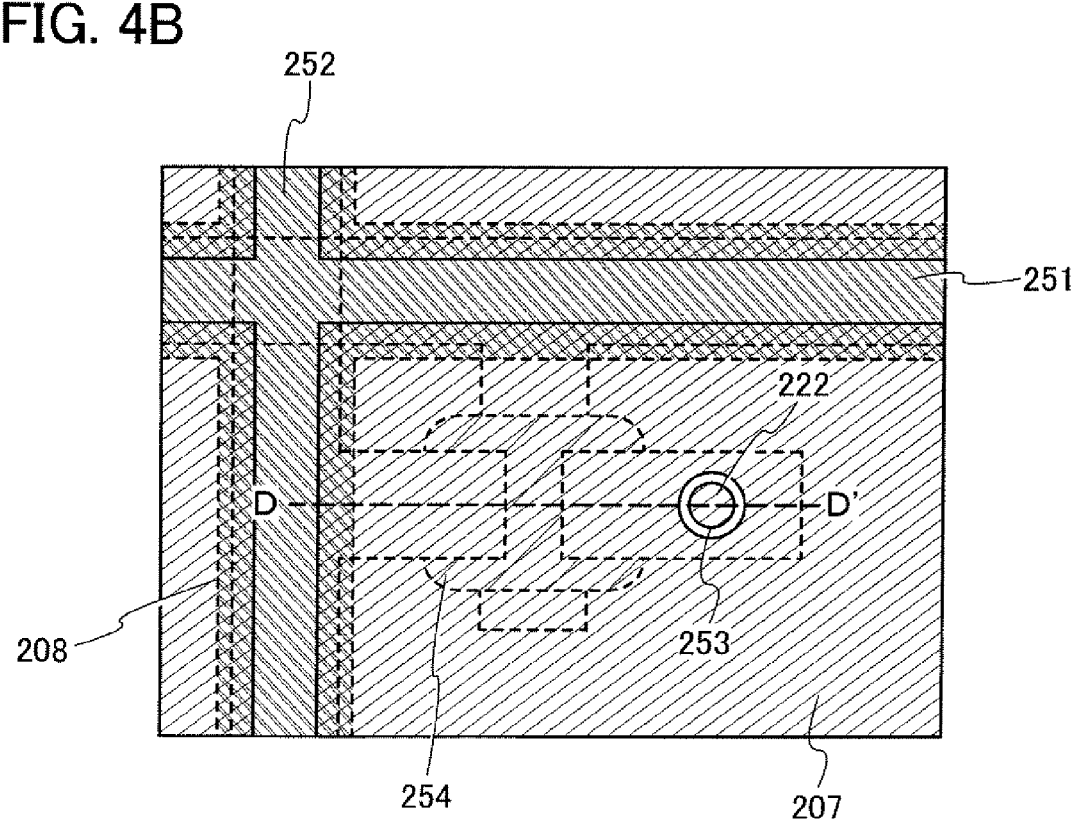

FIG. 4B illustrates a top-view of a liquid crystal display device using the present invention seen from a counter substrate side. This diagram differs from FIG. 3B in that not a round shape but a doughnut shape is removed from the colored layer (color filter). An active matrix substrate is a substrate over which a thin film transistor, an insulating film, a pixel electrode, an alignment film, and the like are formed. A counter substrate to be attached to the active matrix substrate is a substrate on which a light-shielding layer, a colored layer, a counter electrode, an alignment film, and the like are formed. In FIG. 4B, only a gate line 251, a source line 252, a contact hole 253, a semiconductor layer 254 of the thin film transistor, a light-shielding layer 208, and a first colored layer (color filter) 223, a second colored layer (color filter) 222 are illustrated and other elements are omitted. It is to be noted that the same portions as those described in FIG. 3B are denoted by the same reference numerals.

As shown in FIG. 4B, a region corresponding to a slanted portion 221 in the insulating film 202 of the contact hole, which is formed in a source region or a drain region of the thin film transistor over the active matrix substrate, is removed from the colored layer (color filter). The region corresponding to the slanted portion 221 in the insulating film 202 of the contact hole is a region overlapping with the edge of the contact hole. Therefore, in addition to the first colored layer (color filter) 223, the second colored layer (color filter) 222 is formed in a region corresponding to an opening portion of the insulating film 202.

FIG. 4A is an enlarged cross-sectional view of the contact hole along a line D-D' in FIG. 4B. Since a structure of the active matrix substrate is the same as described in FIGS. 3A and 3B, description thereof is omitted.

A structure of the counter substrate will be described below. The light-shielding layer 208, the first colored layer (color filter) 223 and the second colored layer (color filter) 222 are formed to be in contact with the substrate 207. The region corresponding to the slanted portion in the insulating film 202 formed over the active matrix is removed from the colored layer (color filter). The region corresponding to the slanted portion in the insulating film 202 is the region overlapping with the edge of the contact hole. Therefore, the first colored layer (color filter) 223 and the second colored layer (color filter) 222 are formed.

The counter electrode 210 is formed to be in contact with the substrate 207, the first colored layer (color filter) 223, and the second colored layer (color filter) 222. For the counter electrode 210, indium tin oxide (ITO) in which tin oxide is mixed into indium oxide, indium tin silicon oxide (ITSO) in which silicon oxide is mixed into indium tin oxide (ITO), indium zinc oxide (IZO) in which zinc oxide is mixed into indium oxide, zinc oxide (ZnO), tin oxide ($SnO_2$), or the like can be used.

The alignment film 211 is formed over the pixel electrode 210. For the alignment film 211, polyimide resin or the like can be used.

The counter substrate having the above-described structure is attached to the active matrix substrate described in FIG. 3A and the liquid crystal layer 212 is formed therebetween. For the liquid crystal, a ferroelectric liquid crystal (FLC), a nematic liquid crystal, a smectic liquid crystal, a liquid crystal which is to be homogeneously aligned, a liquid crystal which is to be homeotropically aligned, or the like can be used.

The thin film transistor to be formed over the active matrix substrate can be any of a top-gate type, a bottom-gate type, a channel-etched type, or a channel-protective type. Moreover, a source electrode or a drain electrode of the thin film transistor is not necessary to be directly connected to the pixel electrode. The transistor shown in FIGS. 9A to 9D is applicable to FIGS. 4A and 4B as it is with FIGS. 1A and 1B.

By employing the structure shown in FIGS. 4A and 4B, uneven alignment of the liquid crystal molecules above the slanted portion 221 in the insulating film 202 of the contact hole does not influence image display and a display without color phase irregularity can be manufactured. Moreover, the colored layer (color filter) is selectively formed to suppress a decrease in an aperture ratio. Since the structure can be formed in the same process in which an ordinary colored layer is formed, the number of processes does not increase and a complicated process is not necessary.

Embodiment Mode 4

In this embodiment mode, a liquid crystal display device, in which a light-shielding layer is selectively formed and a colored layer (color filter) is selectively removed, will be described with reference to FIGS. 5A to 6B.

Figure 5A:
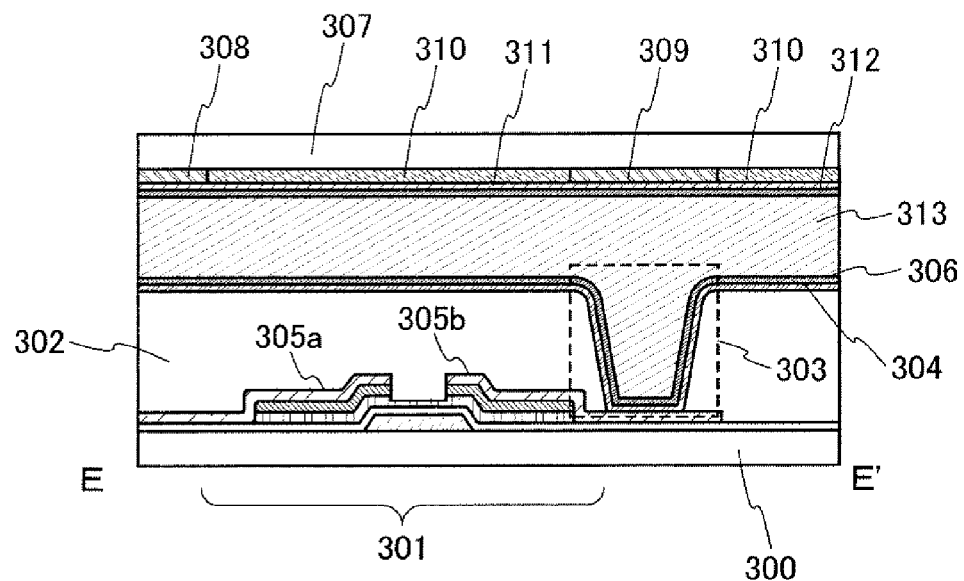
FIGS. 5A and 5B are diagrams illustrating Embodiment Mode 4.
Figure 5B:
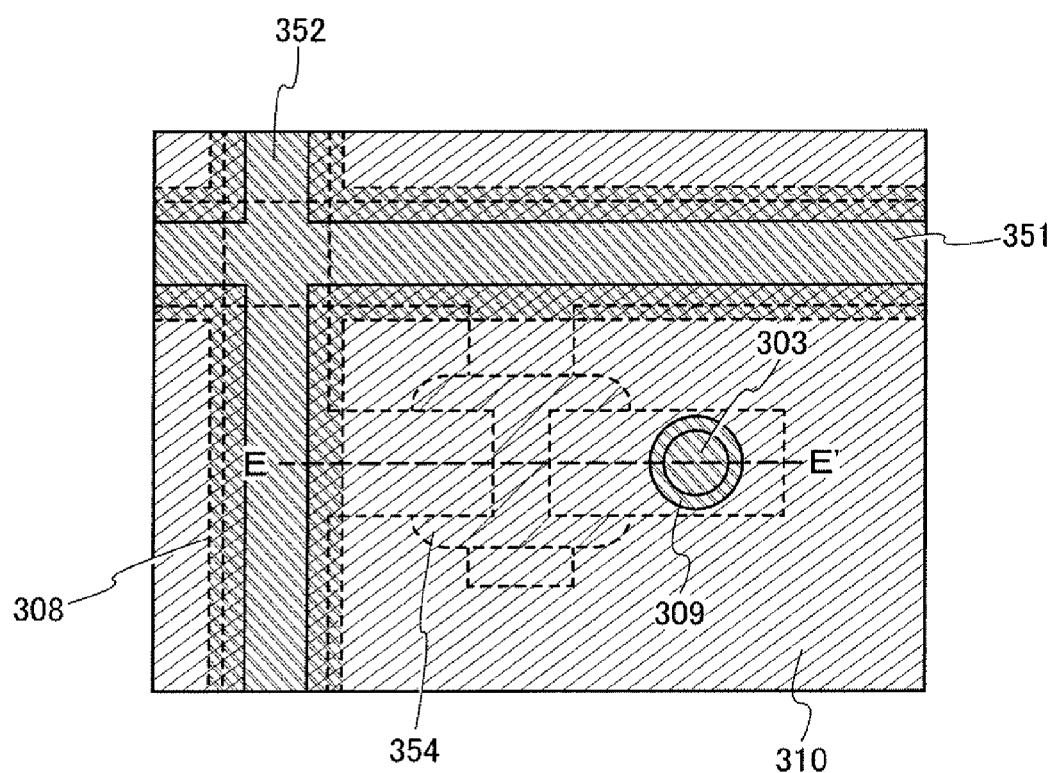

FIG. 5B is a top-view of a liquid crystal display device using the present invention seen from a counter substrate side. An active matrix substrate is a substrate over which a thin film transistor, an insulating film, a pixel electrode, an alignment film, and the like are formed. A counter substrate to be attached to the active matrix substrate is a substrate on which a light-shielding layer, a counter electrode, an alignment film, a colored layer (color filter), and the like are formed. In FIG. 5B, only a gate line 351, a source line 352, a contact hole 303, a semiconductor layer 354 of the thin film transistor, a first light-shielding layer 308, a second light-shielding layer 309, and a colored layer (color filter) 310 are illustrated and other elements are omitted.

As shown in FIG. 5B, as the light-shielding layer, the first light-shielding layer 308 is formed in a region corresponding to the gate line 351 and the source line 352; and the second light-shielding layer 309 is formed in a region corresponding to the contact hole 303 in a source region or a drain region of the thin film transistor. Moreover, a region corresponding to the contact hole 303 in a source region or a drain region of the thin film transistor is removed from the colored layer (color filter). The region corresponding to the contact hole 303 is a region overlapping with the edge of the contact hole 303. In FIG. 5B, the light-shielding layer is formed in a region from which the colored layer (color filter) is removed.

FIG. 5A is an enlarged cross-sectional view of the contact hole along a line E-E' in FIG. 5B. A structure of the active matrix substrate in this embodiment mode will be described below.

A thin film transistor 301 is formed over a substrate 300. For the substrate 300, a glass substrate made of aluminoborosilicate glass, barium borosilicate glass, quartz glass, or the like; a substrate formed with a synthetic resin typified by acrylic or plastic, typically PET (polyethylene terephthalate), PEN (polyethylene naphthalate), PES (polyethersulfone), polypropylene, or the like can be used. Although the thin film transistor 301 can be any of a top-gate type, a bottom-gate type, a channel-etched type, or a channel-protective type, the channel-etched transistor is illustrated in FIG. 5A.

An insulating film 302 is formed over the thin film transistor 301 and then, the contact hole 303 is formed for electrical connection with the thin film transistor 301. The insulating film 302 can be formed by using an organic resin film, an inorganic insulating film, or an insulating film including a Si—O—Si bond formed by using a siloxane-based material as a starting material (a siloxane-based insulating film). Here, the siloxane has a main chain including a bond of silicon (Si) and oxygen (O), and an organic group containing at least hydrogen (for example, an alkyl group or an aryl group) is used for a substituent. A fluoro group can also be a substituent. Further, the organic group containing at least hydrogen and the fluoro group can be used for the substituent. Furthermore, a low-dielectric material can be used for the insulating film.

A pixel electrode 304 is formed so as to cover the thin film transistor 301 and the insulating film 302. The pixel electrode 304 is electrically connected to a drain electrode 305b of the exposed thin film transistor 301.

In the case of manufacturing a reflective liquid crystal display device, a reflective metal is used for a pixel electrode 304. In the case of manufacturing a transmissive liquid crystal display device, indium tin oxide (ITO) in which tin oxide is mixed into indium oxide, indium tin silicon oxide (ITSO) in which silicon oxide is mixed into indium tin oxide (ITO), indium zinc oxide (IZO) in which zinc oxide is mixed into indium oxide, zinc oxide (ZnO), tin oxide ($SnO_2$), or the like can be used. In the case of manufacturing a semi-transmissive liquid crystal display device, a reflective metal is used for a pixel electrode in a reflective region; and for a transmissive region, a transmissive material is used (for example, indium tin oxide (ITO) in which tin oxide is mixed into indium oxide, indium tin silicon oxide (ITSO) in which silicon oxide is mixed into indium tin oxide (ITO), indium zinc oxide (IZO) in which zinc oxide is mixed into indium oxide, zinc oxide (ZnO), tin oxide ($SnO_2$), or the like).

An alignment film 306 is formed over the pixel electrode 304. For the alignment film 306, polyimide resin or the like can be used.

Next, a structure of the counter substrate in this embodiment mode will be described below.

The first light-shielding layer 308, the second light-shielding layer 309 and the colored layer (color filter) 310 are formed to be in contact with a substrate 307. Although the first light-shielding layer 308 is formed so as to cover a source wiring, only a part of the source electrode 305a is covered. The second light-shielding layer 309 is formed in accordance with the contact hole 303. For the substrate 307, a glass substrate made of aluminoborosilicate glass, barium borosilicate glass, quartz glass, or the like; a substrate formed with a synthetic resin typified by acrylic or plastic, typically PET (polyethylene terephthalate), PEN (polyethylene naphthalate), PES polyethersulfone), polypropylene, or the like can be used. As the first light-shielding layer 308 and the second light-shielding layer 309, a film having a light-shielding property (for example, a single layer film of chromium (Cr), a stacked film of chromium oxide ($Cr_xO_y$) and chromium (Cr), a resin film in which colorant such as carbon black, dye, or the like is dispersed) can be used.

As shown in FIG. 5B, the first light-shielding layer 308 is formed in a region corresponding to the gate line 351 and the source line 352 over the active matrix substrate; and the second light-shielding layer 309 is formed in a region corresponding to the contact hole 303 in a source region or a drain region of the thin film transistor over the active matrix substrate. The region corresponding to the contact hole 303 is a region overlapping with the contact hole 303.

The second light-shielding layer 309 is formed in the region corresponding to the contact hole 303 in the active matrix substrate, separately from the first light-shielding layer 308 formed in the region corresponding to the gate line 351 and the source line 352. Therefore, since the region where the second light-shielding layer 309 is formed does not function as a display portion, even if liquid crystal molecules are unevenly aligned in the layer above the contact hole, a display device having high image quality and having no color phase irregularity can be provided.

The first light-shielding layer 308 is formed above the gate line 351 and the source line 352 but the whole thin film transistor is not covered. Since such structure is employed, a decrease in an aperture ratio can be minimized.

By separately forming the light-shielding layers as the first light-shielding layer 308 and the second light-shielding layer 309, a decrease in an aperture ratio can be minimized and a display device having high contrast, high image quality, and having no color phase irregularity can be provided.

The shape of the second light-shielding layer 309 can be anything as long as the second light-shielding layer 309 is formed in a region corresponding to the contact hole in the active matrix substrate. For example, a circular shape, an oval shape, a square shape, a rectangular shape, a triangular shape, or the like is given.

Next, the colored layer (color filter) 310 is formed. The colored layer (color filter) is removed in accordance with the contact hole 303 formed in the insulating film 302. The colored layer 310 can have a single color or 256 gray-scales.

A portion to be removed from the colored layer (color filter) can have any shape as long as the portion is within a region corresponding to the contact hole 303 in the active matrix substrate. For example, a circular shape, an oval shape, a square shape, a rectangular shape, a triangular shape, or the like is given.

Next, the counter electrode 311 is formed. For the counter electrode 311, indium tin oxide (ITO) in which tin oxide is mixed into indium oxide, indium tin silicon oxide (ITSO) in which silicon oxide is mixed into indium tin oxide (ITO), indium zinc oxide (IZO) in which zinc oxide is mixed into indium oxide, zinc oxide (ZnO), tin oxide ($SnO_2$), or the like can be used.

An alignment film 312 is formed on the counter electrode 311. For the alignment film 312, polyimide resin or the like can be used.

The active matrix substrate having the above-described structure is attached to the counter substrate and the liquid crystal layer 313 is formed therebetween. For the liquid crystal, a ferroelectric liquid crystal (FLC), a nematic liquid crystal, a smectic liquid crystal, a liquid crystal which is to be homogeneously aligned, a liquid crystal which is to be homeotropically aligned, or the like can be used.

The thin film transistor to be formed over the active matrix substrate can be any of a top-gate type, a bottom-gate type, a channel-etched type, or a channel-protective type. Moreover, a source electrode or a drain electrode of the thin film transistor is not necessary to be directly connected to the pixel electrode. The transistor shown in FIGS. 9A to 9D is applicable to FIGS. 5A and 5B as it is with FIGS. 1A and 1B.

By employing the structure shown in FIGS. 5A and 5B, uneven alignment of the liquid crystal molecules above the contact hole 303 does not influence image display, and, therefore, a display without color phase irregularity can be manufactured. Moreover, by selectively forming the light-shielding layer and selectively removing the colored layer (color filter), a decrease in an aperture ratio can be suppressed. Since the structure can be formed in the same process in which an ordinary light-shielding layer and the colored layer are formed, the number of processes does not increase and a complicated process is not necessary.

The light-shielding layer is formed in a region corresponding to a slanted portion of the insulating film of the contact hole in the active matrix substrate, that is, in the region overlapping with the edge of the contact hole. Then, the colored layer (color filter) can be removed. This is because alignment of the liquid crystal molecules is most likely to get uneven around the slanted region of the insulating film 302 (the edge of the contact hole).

Figure 6A:
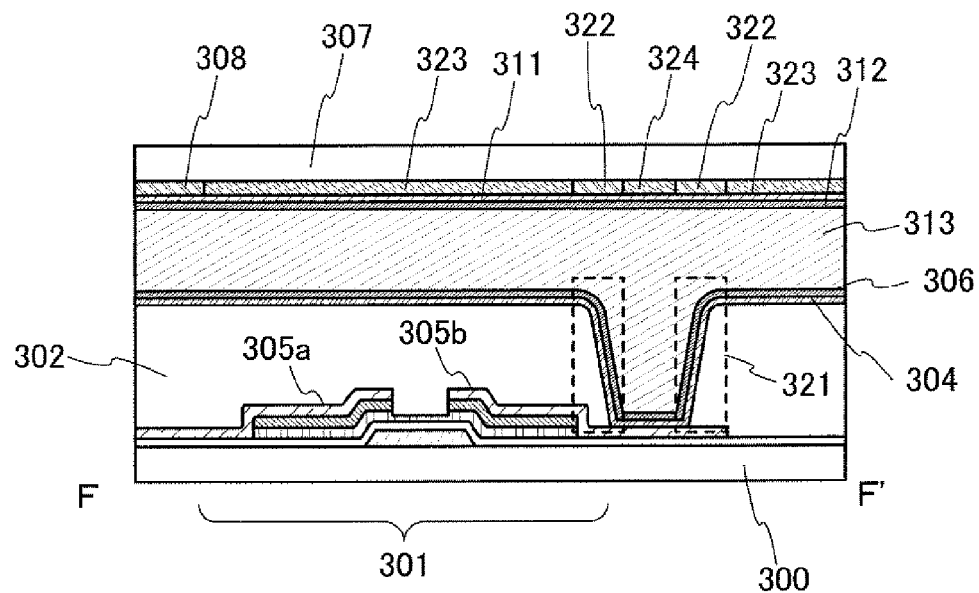
FIGS. 6A and 6B are diagrams illustrating Embodiment Mode 4.
Figure 6B:
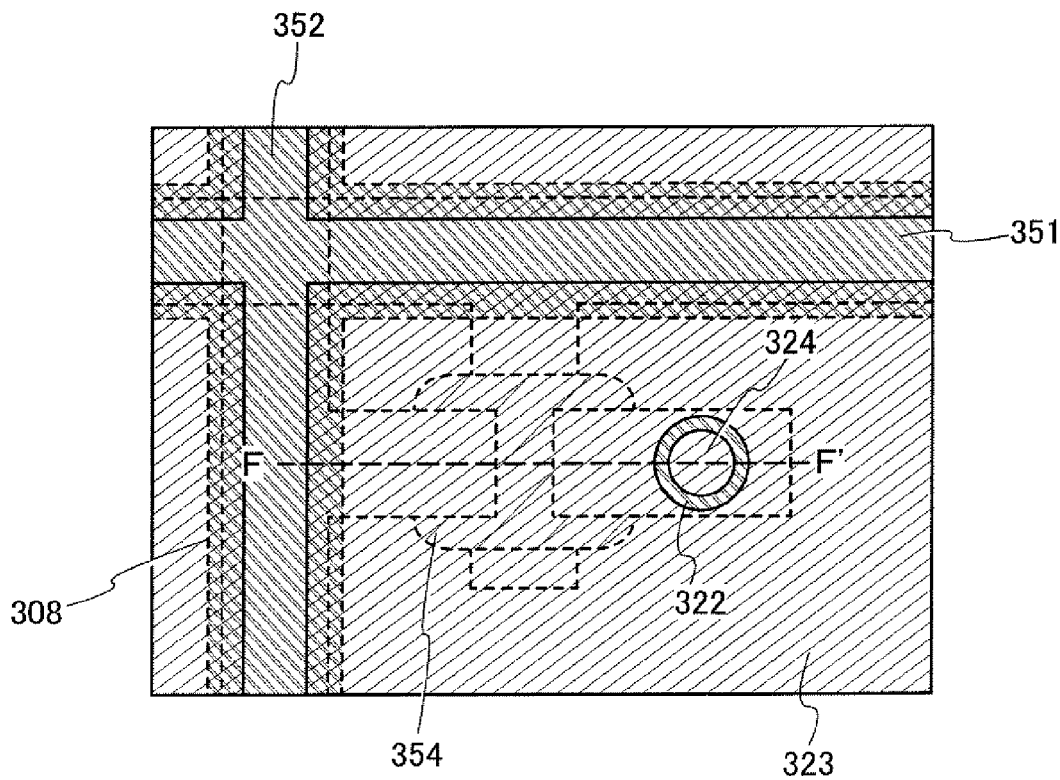

FIG. 6B illustrates a top-view of a liquid crystal display device using the present invention seen from a counter substrate side. This diagram differs from FIG. 5B in that not a round shape but a doughnut shape is removed from the colored layer. An active matrix substrate is a substrate over which a thin film transistor, an insulating film, a pixel electrode, an alignment film, and the like are formed. A counter substrate to be attached to the active matrix substrate is a substrate on which a light-shielding layer, a colored layer, a counter electrode, an alignment film, and the like are formed. In FIG. 6B, only the gate line 351, the source line 352, the semiconductor layer 354 of the thin film transistor, the first light-shielding layer 308, the second light-shielding layer 322, a first colored layer (color filter) 323, and a second colored layer (color filter) 324 are illustrated and other elements are omitted. It is to be noted that the same portions as those described in FIG. 5 are denoted by the same reference numerals.

As shown in FIG. 6B, the second light-shielding layer 322 is formed in a region corresponding to a slanted portion 321 in the insulating film 302 of the contact hole, which is formed in a source region or a drain region in the thin film transistor over the active matrix substrate. Then, the colored layer (color filter) is removed. The region corresponding to the slanted portion 321 in the insulating film 302 is a region overlapping with the edge of the contact hole.

FIG. 6A is an enlarged cross-sectional view of the contact hole along a line F-F' in FIG. 6B. Since a structure of the active matrix substrate is the same as FIGS. 5A and 5B, description thereof is omitted.

A structure of the counter substrate will be described below. The first light-shielding layer 308, the second light-shielding layer 322, the first colored layer (color filter) 323, and the second colored layer (color filter) 324 are formed to be in contact with the substrate 307. Although the first light-shielding layer 308 is formed so as to cover a source wiring, only a part of the source electrode 305a is covered. The second light-shielding layer 322 is formed in accordance with the slanted portion 321 in the insulating film 302 of the contact hole. For the substrate 307, a glass substrate made of aluminoborosilicate glass, barium borosilicate glass, quartz glass, or the like; a substrate formed with a synthetic resin typified by acrylic or plastic, typically PET (polyethylene terephthalate), PEN (polyethylene naphthalate), PES (polyethersulfone), polypropylene, or the like can be used. As the first light-shielding layer 308 and the second light-shielding layer 322, a film having a light-shielding property (for example, a single layer film of chromium (Cr), a stacked film of chromium oxide ($Cr_xO_y$) and chromium (Cr), a resin film in which colorant such as carbon black, dye, or the like is dispersed) can be used.

As shown in FIG. 6B, the first light-shielding layer 308 is formed in a region corresponding to the gate line 351 and the source line 352 over the active matrix substrate, and the second light-shielding layer 322 is formed in a region corresponding to the slanted portion 321 in the insulating film 302 of the contact hole, which is formed in a source region or a drain region of the thin film transistor over the active matrix. The region corresponding to the slanted portion 321 of the insulating film 302 is a region overlapping with the edge of the contact hole.

The second light-shielding layer 322 is formed in the region corresponding to the slanted portion 321 in the insulating film 302 of the contact hole, which is formed in the active matrix substrate, separately from the first light-shielding layer 308 formed in the region corresponding to the gate line 351 and the source line 352. Therefore, since the region where the second light-shielding layer 322 is formed does not function as a display portion, even if liquid crystal molecules are unevenly aligned, a display device having high image quality and having no color phase irregularity can be provided.

Although the first light-shielding layer 308 is formed above the gate line 351 and the source line 352, the whole thin film transistor is not covered. Because of such a structure, a decrease in an aperture ratio can be minimized.

By separately forming the light-shielding layers as the first light-shielding layer 308 and the second light-shielding layer 322, a decrease in an aperture ratio can be minimized and a display device having high contrast, high image quality, and having no color phase irregularity can be provided.

The shape of the second light-shielding layer 322 can be anything as long as the second light-shielding layer 322 is formed in a region corresponding to the contact hole in the active matrix substrate. For example, a circular shape, an oval shape, a square shape, a rectangular shape, a triangular shape, or the like is given.

Next, the first colored layer (color filter) 323 and the second colored layer (color filter) 324 are formed. The colored layer (color filter) is removed in accordance with the slanted region in the insulating film of the contact hole (the edge of the contact hole) formed in the active matrix substrate. The colored layers (color filters) can have a single color or 256 gray-scales.

A portion to be removed from the colored layer (color filter) can have any shape as long as the portion is within a region corresponding to the contact hole in the active matrix substrate. For example, a circular shape, an oval shape, a square shape, a rectangular shape, a triangular shape, or the like is given.

Next, the counter electrode 311 is formed. For the counter electrode 311 indium tin oxide (ITO) in which tin oxide is mixed into indium oxide, indium tin silicon oxide (ITSO) in which silicon oxide is mixed into indium tin oxide (ITO), indium zinc oxide (IZO) in which zinc oxide is mixed into indium oxide, zinc oxide (ZnO), tin oxide ($SnO_2$), or the like can be used.

An alignment film 312 is formed on the counter electrode 311. For the alignment film 312, polyimide resin or the like can be used.

The active matrix substrate having the above-described structure is attached to the counter substrate and the liquid crystal layer 313 is formed therebetween. For the liquid crystal, a ferroelectric liquid crystal (FLC), a nematic liquid crystal, a smectic liquid crystal, a liquid crystal which is to be homogeneously aligned, a liquid crystal which is to be homeotropically aligned, or the like can be used.

The thin film transistor to be formed over the active matrix substrate can be any of a top-gate type, a bottom-gate type, a channel-etched type, or a channel-protective type. Moreover, a source electrode or a drain electrode of the thin film transistor is not necessary to be directly connected to the pixel electrode. The transistor shown in FIGS. 9A to 9D is applicable to FIGS. 6A and 6B as it is with FIGS. 1A and 1B.

By employing the structure shown in FIGS. 6A and 6B, uneven alignment of the liquid crystal molecules above the slanted portion 321 in the insulating film 302 of the contact hole does not influence image display and, therefore, a display without color phase irregularity can be manufactured. Moreover, by selectively forming the light-shielding layer and selectively removing the colored layer (color filter), a decrease in an aperture ratio can be suppressed. Since the second light-shielding layer 322 can be formed in the same process in which the first light-shielding layer 308 is formed in the region corresponding to the gate line 351 and the source line 352 over the active matrix substrate, and the colored layer can be formed in the same process in which an ordinary light-shielding layer is formed, the number of processes does not increase and a complicated process is not necessary.

Embodiment Mode 5

In this embodiment mode, aspects other than Embodiment Modes 2 and 4 will be described.

Figure 15A:
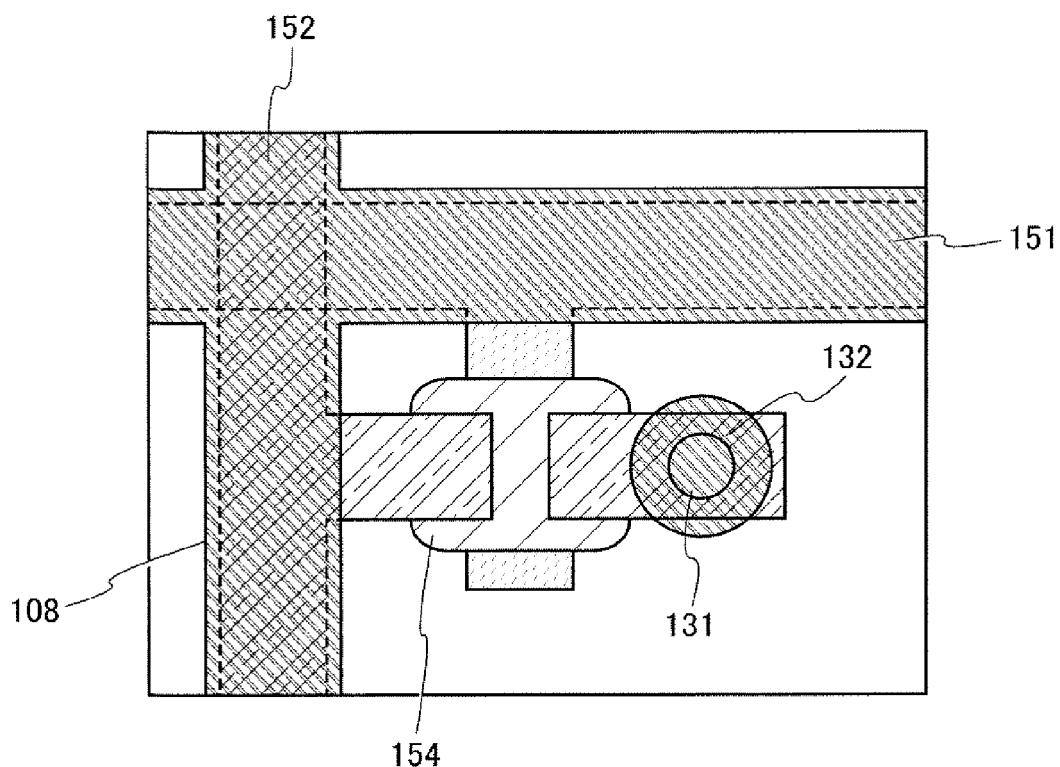
FIGS. 15A and 15B are diagrams illustrating Embodiment Mode 5.
Figure 15B:
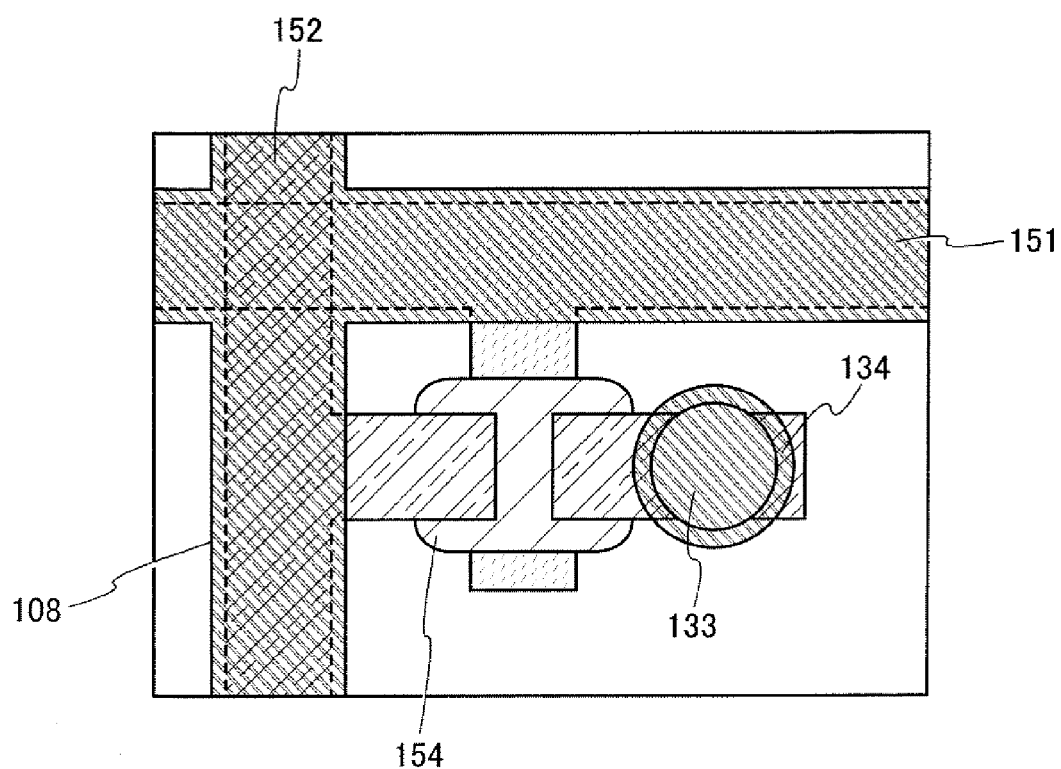

FIGS. 15A and 15B illustrate other modes of FIG. 1B. In FIGS. 15A and 15B, a gate line 151, a source line 152, and a first light-shielding layer 108 are the same as those shown in FIG. 1B.

Although FIG. 1B illustrates an example in which a second light-shielding layer 109 and a contact hole are smaller than a drain electrode, a structure shown in FIG. 15A may be used in which a second light-shielding layer 132 covers a contact hole 131 and part of the second light-shielding layer 132 does not overlap with the drain electrode. In addition, a structure shown in FIG. 15B may be used in which each part of a second light-shielding layer 134 and the edge of a contact hole 133 do not overlap with the drain electrode.

Moreover, FIGS. 15A, 15B, and 2B can be combined together. Although FIG. 2B illustrates an example in which a second light-shielding layer 122 and a contact hole 153 are smaller than the drain electrode, a structure, in which the second light-shielding layer covers the edge of the contact hole and part of the second light-shielding layer does not overlap with the drain electrode, can be used. In addition, a structure, in which each part of the second light-shielding layer and the edge of the contact hole do not overlap with the drain electrode, can be used.

Similarly, FIGS. 15A, 15B, and 3B can be combined together. Although FIG. 3B illustrates an example in which a portion to be removed from a colored layer (color filter) is smaller than the drain electrode, a structure in which the portion to be removed from the colored layer (color filter) covers the contact hole as well as part of the portion to be removed from the colored layer (color filter) does not overlap with the drain electrode.

Similarly, FIGS. 15A, 15B, and 5B can be combined together. Although FIG. 5B illustrates an example in which a portion to be removed from a colored layer (color filter) is smaller than the drain electrode, a structure, in which the portion to be removed from the colored layer (color filter) covers the edge of the contact hole and part of the portion to be removed from the colored layer (color filter) does not overlap with the drain electrode, can be used. In addition, a structure, in which each the portion to be removed from the colored layer (color filter) and the edge of the contact hole do not overlap with the drain electrode, can be used.

Similarly, FIGS. 15A, 15B, and 5B can be combined together. Although FIG. 5B illustrates an example in which a second light-shielding layer 309 and a contact hole 303 are smaller than the drain electrode, a structure, in which the second light-shielding layer covers the contact hole and part of the second light-shielding layer does not overlap with the drain electrode, can be used. In addition, a structure, in which each part of the second light-shielding layer and the edge of the contact hole do not overlap with the drain electrode, can be used.

Similarly, FIGS. 15A, 15B, and 6B can be combined together. Although FIG. 6B illustrates an example in which a second light-shielding layer 322 and a contact hole are smaller than the drain electrode, a structure, in which the second light-shielding layer covers the edge of contact hole and part of the second light-shielding layer does not overlap with the drain electrode, can be used. In addition, a structure, in which each part of the second light-shielding layer and the edge of the contact hole do not overlap with the drain electrode, can be used.

Embodiment Mode 6

In this embodiment mode, a method for manufacturing a counter substrate using the present invention will be described with reference to FIGS. 5A to 8F.

Figure 8A:
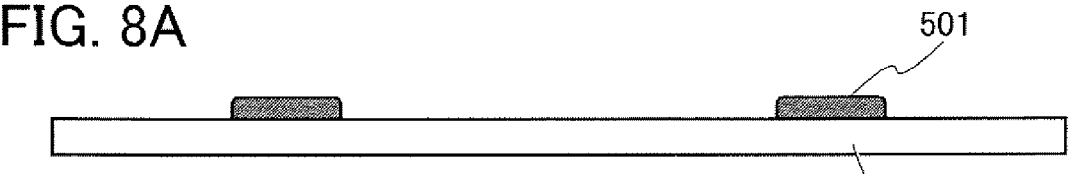
FIGS. 8A to 8F are diagrams illustrating Embodiment Mode 6.
Figure 8B:
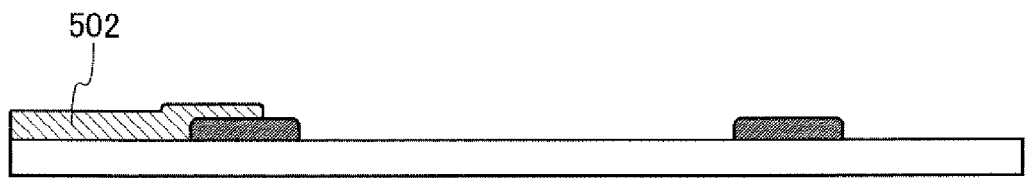
Figure 8C:
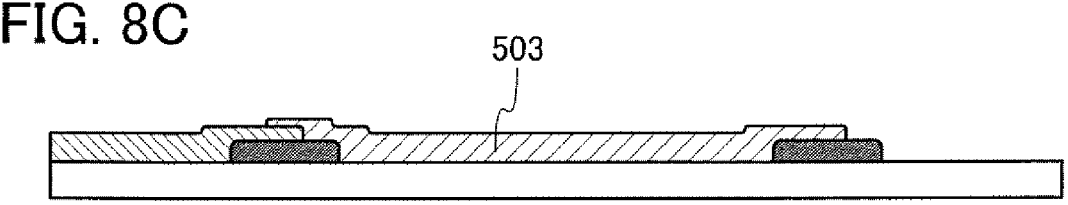
Figure 8D:
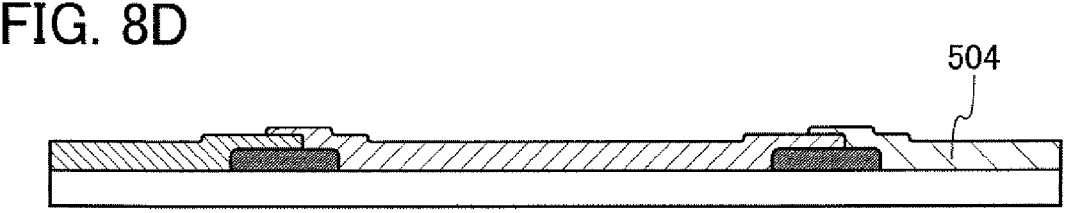

A metal chromium film is formed which is to be a light-shielding layer 501 over a substrate 500. For the substrate 500, a glass substrate made of aluminoborosilicate glass, barium borosilicate glass, quartz glass, or the like; a substrate formed with a synthetic resin typified by acrylic or plastic, typically PET (polyethylene terephthalate), PEN (polyethylene naphthalate), PES (polyethersulfone), polypropylene, or the like can be used. As a method of forming the metal chromium film, a sputtering method or the like may be used. Next, the metal chromium film is patterned into a desired shape by a photolithography method to form the light-shielding layer 501 (FIG. 8A).

Note that as a material of the light-shielding layer, a film having a light-shielding property (for example, a single layer film of chromium (Cr), a stacked film of chromium oxide ($Cr_xO_y$) and chromium (Cr), a resin film, in which colorant such as carbon black or dye, or the like is dispersed) can be used. Alternatively, color filters of R, G and B can be stacked to be used as the light-shielding layer.

Here, in order to employ the structure shown in FIGS. 1A and 1B, light-shielding layers are formed in a region corresponding to the gate line 151 and the source line 152 over the active matrix substrate, and a region corresponding to the contact hole 103 in a source region or a drain region of a thin film transistor. In order to employ the structure shown in FIGS. 2A and 2B, light-shielding layers are formed in a region corresponding to the gate line 151 and the source line 152 over the active matrix substrate, and in a region corresponding to the slanted portion 121 in the insulating film 102 (the edge of the contact hole) of the contact hole 153 which is formed in a source region or a drain region of the thin film transistor. In order to employ the structure shown in FIGS. 3A to 4B, a light-shielding layer is formed in a region corresponding to the gate line 251 and the source line 252 over the active matrix substrate. In order to employ the structure shown in FIGS. 5A and 5B, light-shielding layers are formed in a region corresponding to the gate line 351 and the source line 352 over the active matrix substrate, and in a region corresponding to the contact hole 303 in a source region or a drain region of a thin film transistor. In order to employ the structure shown in FIGS. 6A and 6B, light-shielding layers are formed in a region corresponding to the gate line 351 and the source line 352 over the active matrix substrate, and in a region corresponding to the slanted portion 321 in the insulating film 302 (the edge of the contact hole) of the contact hole which is formed in a source region or a drain region of a thin film transistor.

Next, a colored layer (color filter) is formed. A color filter can be manufactured by any of a pigment dispersion method, a staining method, an electrodeposition method, a printing method, or the like. In this embodiment mode, the case of employing a pigment dispersion method is described.

The pigment dispersion method is classified into an etching method and a color resist method. In the case of employing the etching method, an R colored resin film 502 is formed as follows: a colored resin, in which an R pigment is dispersed, is applied by a spin coating method or the like to a substrate over which a light-shielding layer is formed; the substrate is dried and preheated; mask light-exposure process is performed after a positive resist is applied to the substrate; the positive resist is developed by alkaline solution; the colored resin film is etched; and positive resist is peeled off by organic solvent (FIG. 5B).

In forming G and B colored resins, the same process as above is performed to form a G colored resin film 503 and a B colored resin film 504 (FIGS. 5C to 5D). Then a protective film is applied (not shown in the figure). By the above-mentioned process, the color filter is formed.

In the case of using a color resist method (not shown in the figure), a light curable colored resin like a resist is used for the color resist. The color resist is formed by dissolving an acrylic or epoxy-based UV curing resin (a negative resist) or the like in which pigment is dispersed, in a solvent. The color resist (R) is applied to the substrate over which the light-shielding layer is formed, by a spin coating method or the like. Then, the substrate is exposed to light through the mask and developed to be patterned into a desired shape.

In forming color resists G and B, the same process as above is performed and a protective film is applied (not shown in the figure). By above-mentioned process, the colored layer (color filter) is formed.

In the case of employing the structure shown in FIGS. 1A to 2B, a colored layer (color filter) is not necessary to be removed. In the case of employing the structure shown in FIGS. 3A and 3B, and 5A and 5B, the region corresponding to the contact hole in a source region or a drain region of the thin film transistor over the active matrix substrate, is removed from the colored layer. In the case of employing the structure shown in FIGS. 4A and 4B, and 6A and 6B, the region corresponding to the slanted region in the insulating film of the contact hole (the edge of the contact hole) in a source region or a drain region of the thin film transistor over the active matrix substrate, is removed from a colored layer (color filter).

Figure 8E:
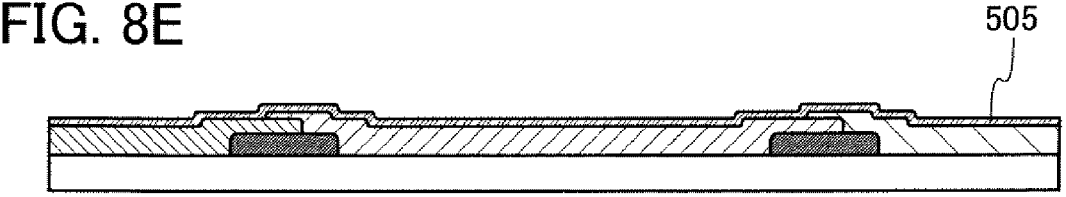

Next, a counter electrode 505 is formed (FIG. 8E). For the counter electrode 505, indium tin oxide (ITO) in which tin oxide is mixed into indium oxide, indium tin silicon oxide (ITSO) in which silicon oxide is mixed into indium tin oxide (ITO), indium zinc oxide (IZO) in which zinc oxide is mixed into indium oxide, zinc oxide (ZnO), tin oxide ($SnO_2$), or the like can be used. As a method for film formation, vacuum vapor deposition, a sputtering method, and the like can be given.

Figure 8F:
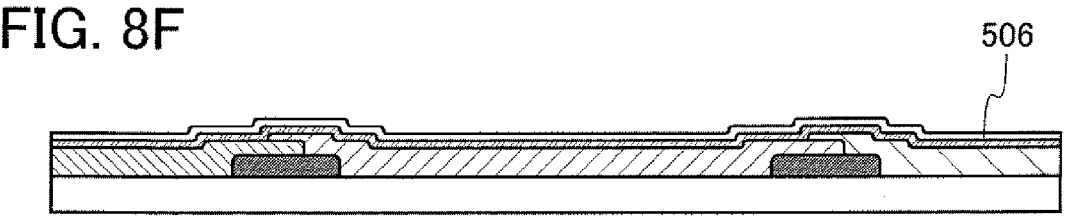

An insulating film 506 which functions as an alignment film is formed (FIG. 8F). The insulating film 506 is formed by formation of a polymer film such as polyimide or polyvinyl alcohol by a printing method, a roll coating method, or the like followed by application of a rubbing treatment to the polymer film. Alternatively, the insulating film 506 can be formed by deposition of silicon oxide from an oblique angle to a substrate. In addition, the insulating film 506 can be formed by irradiating a photoreactive-type polymer with polarized UV light, and polymerizing the photoreactive-type polymer. Here, the insulating film 506 is formed by printing a polymer film such as polyimide or polyvinyl alcohol by a printing method and by applying a rubbing treatment to the polymer film after baking treatment.

Through the above-described process, the counter substrate on which a light-shielding layer is selectively formed can be manufactured.

This embodiment mode can be freely combined with Embodiment Modes 1 to 4.

Embodiment Mode 7

Figure 10A:
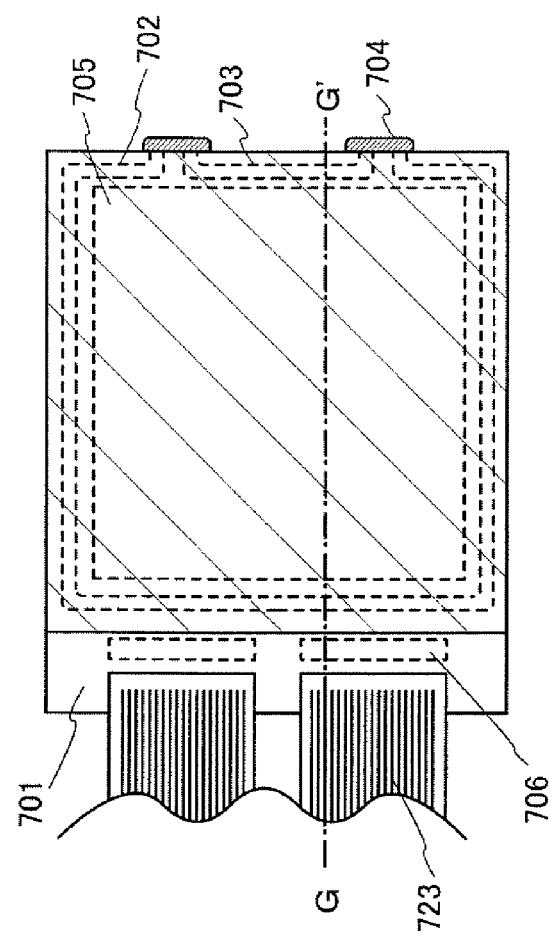
FIGS. 10A and 10B show a liquid crystal display device using the present invention.
Figure 10B:
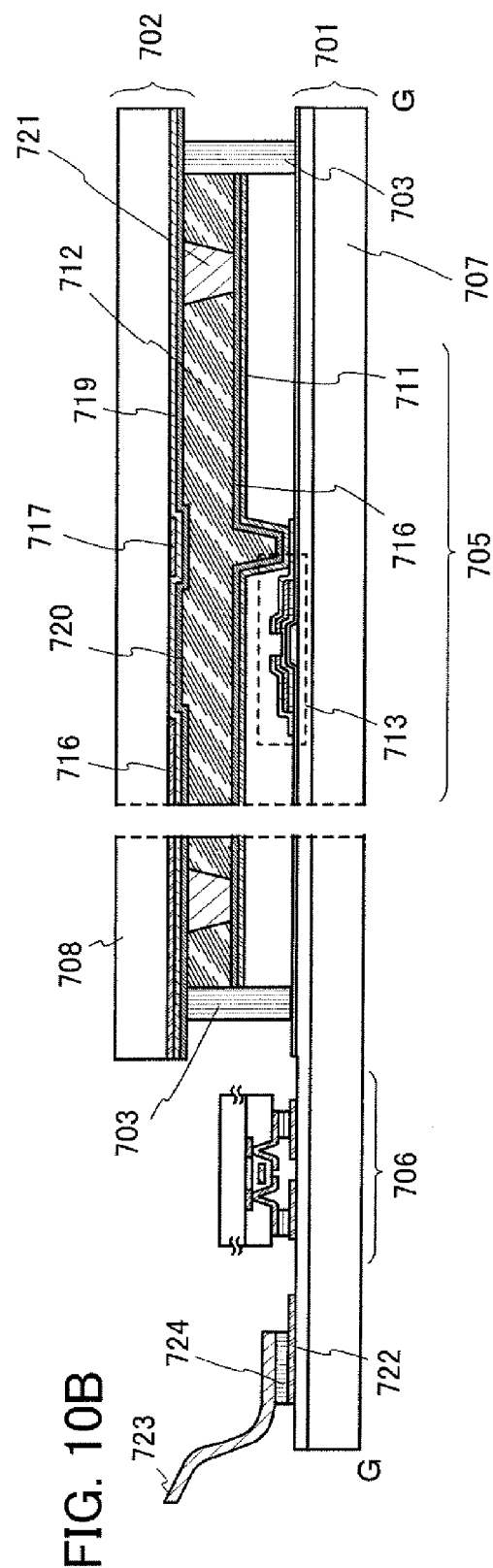

In this embodiment mode, a structure of a liquid crystal display device of the present invention will be explained with reference to FIGS. 10A and 10B. FIG. 10A is a top view of a liquid crystal panel in which a liquid crystal layer is interposed between an active matrix substrate 701 and a counter substrate 702. FIG. 10B corresponds to a cross-sectional view taken along a line G-G' in FIG. 10A. The active matrix substrate 701 can be formed by any method while the substrate described in Embodiment Modes 1 to 4 is used for the counter substrate 702. Here, the substrate described in Embodiment Mode 2 is shown.

In FIG. 10A, a portion 705 is a pixel portion, and a portion 706 is a driver circuit portion. In this embodiment mode, the pixel portion 705 is formed in a region surrounded by a sealant 703, and the driver circuit portion 706 is mounted outside the region.

The sealant 703 used for sealing a space between the active matrix substrate 701 and the counter substrate 702 contains a gap material for maintaining the distance of the enclosed space. The space surrounded by the active matrix substrate 701, the counter substrate 702, and the sealant 703 is filled with a liquid crystal layer. Although FIG. 10A shows a case where, after attaching the active matrix substrate 701 and the counter substrate 702 to each other by the sealant 703, a space between both substrates is filled with a liquid crystal, and then conducting sealing with a sealing member 704, the present invention is not limited thereto. A method (ODF method) can also be employed, in which both of the active matrix substrate 701 and the counter substrate 702 are attached to each other after dropping a liquid crystal over one of the substrates.

Next, the cross-sectional structure will be explained with reference to FIG. 10B. The pixel portion 705 is formed over a first substrate 707 which forms the active matrix substrate 701 and includes a plurality of semiconductor elements typified by TFTs. Further, in this embodiment mode, a source line driver circuit and a gate line driver circuit are included in the driver circuit portion 706 mounted on the substrate.

The pixel portion 705 is provided with a plurality of pixels, and a first electrode 711 as a pixel electrode is electrically connected to a TFT 713.

On the other hand, on a second substrate 708, which forms the counter substrate 702, a first light-shielding layer 716, a second light-shielding layer 717, and a second electrode 719 are formed. In addition, an alignment film 720 is formed on the second electrode 719.

The second light-shielding layer 717 is formed in a region corresponding to the contact hole formed over the active matrix substrate 701.

In the liquid crystal display device shown in this embodiment mode, a portion in which a liquid crystal layer 712 is interposed between the first electrode 711 formed over the active matrix substrate 701 and the second electrode 719 formed on the counter substrate 702 is a liquid crystal element.

Reference numeral 721 denotes a columnar spacer that is provided to control a distance (cell gap) between the active matrix substrate 701 and the counter substrate 702. The columnar spacer 721 is formed by etching an insulating film into a desired shape. It is to be noted that a spherical spacer can be used as well.

Various signals and electrical potentials to be given to the pixel portion 705 and the driver circuit portion 706 are supplied from an FPC 723 through a connecting wiring 722. The connecting wiring 722 and the FPC 723 are electrically connected to each other with an anisotropic conductive film or an anisotropic conductive resin 724. It is to be noted that a conductive paste such as solder or silver paste can be used instead of the anisotropic conductive film or the anisotropic conductive resin.

Although not shown, a polarizing plate is fixed by an adhesive onto one or both of the surface of the active matrix substrate 701 and the surface of the counter substrate 702. It is to be noted that a retardation film can be provided additionally to the polarizing plate.

Embodiment Mode 8

In this embodiment mode, a method for mounting a driver circuit in a liquid crystal display device of the present invention will be explained with reference to FIGS. 11A to 11C.

Figure 11A:
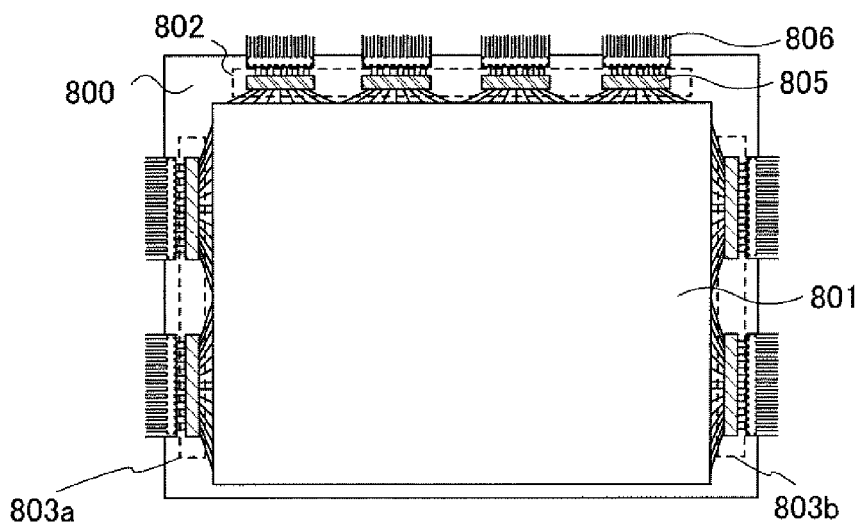
FIGS. 11A to 11C show a driver circuit of a liquid crystal display device using the present invention.

In FIG. 11A, a source line driver circuit 802 and gate line driver circuits 803a and 803b are mounted on the periphery of a pixel portion 801. That is to say, the source line driver circuit 802, the gate line driver circuits 803a and 803b, and the like are mounted by mounting an IC chip 805 on a substrate 800 by a mounting method using a known anisotropic conductive adhesive and an anisotropic conductive film, a COG method, a wire bonding method, reflow treatment using a solder bump, or the like. It is to be noted that the IC chip 805 is connected to an external circuit through an FPC (Flexible Printed Circuit) 806.

Note that part of the source line driver circuit 802, for example, an analog switch, can be formed over the substrate while another portion can be mounted by an IC chip separately.

Figure 11B:
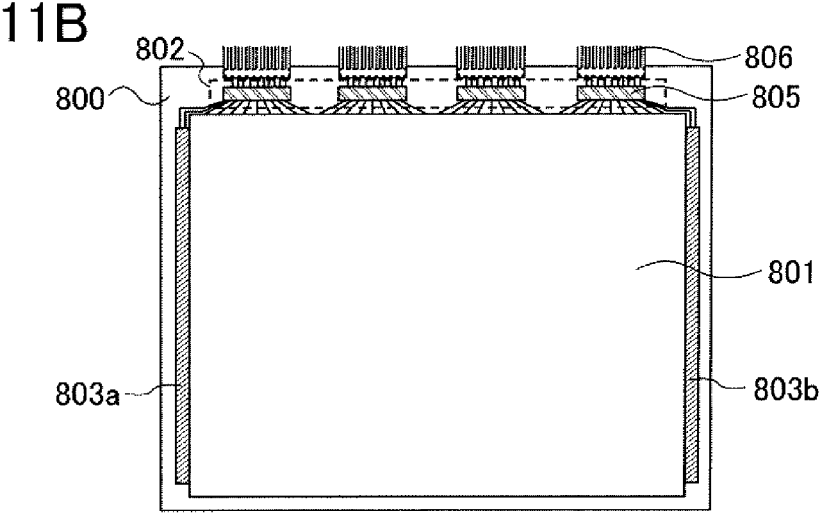

In FIG. 11B, a pixel portion 801, gate line driver circuits 803a and 803b, and the like are formed over a substrate, and a source line driver circuit 802 and the like are separately mounted using an IC chip. That is to say, by mounting an IC chip 805 by a mounting method such as a COG method on a substrate 800 over which the pixel portion 801, the gate line driver circuits 803a and 803b, and the like are formed, the source line driver circuit 802 and the like are mounted. It is to be noted that the IC chip 805 is connected to an external circuit through an FPC 806.

Note that part of the source line driver circuit 802, for example, an analog switch, can be formed over the substrate while another portion can be mounted by an IC chip separately.

Figure 11C:
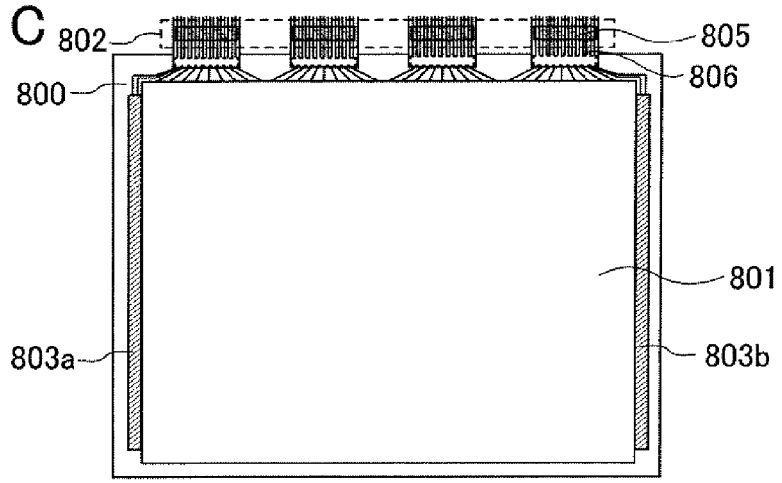

Moreover, in FIG. 11C, the source line driver circuit 802 and the like are mounted by a TAB method. Note that the IC chip 805 is connected to an external circuit through the FPC 806. In FIG. 11C, although the source line driver circuit 802 and the like is mounted by the TAB method, a gate line driver circuit and the like can also be mounted by the TAB method.

When the IC chip 805 is mounted by a TAB method, a pixel portion can be provided to occupy a large area with respect to the substrate, whereby a narrower frame can be accomplished.

Instead of the IC chip 805, an IC in which an IC is formed over a glass substrate (hereinafter referred to as a driver IC) can be provided. Since the IC chip 805 is extracted from a circular silicon wafer, the shape of a mother substrate is limited. Meanwhile, the driver IC is formed using a glass substrate as a mother substrate, the shape of which is not limited, resulting in increased productivity. Accordingly, the shape and size of the driver IC can be freely determined. For example, when a driver IC with a long side of 15 to 80 mm is formed, the smaller number of driver ICs is required as compared with the case of mounting an IC chip. As a result, the number of connecting terminals can be reduced and productive yield can be increased.

The driver IC can be formed using a crystalline semiconductor formed over a substrate, and the crystalline semiconductor can be formed by irradiation of an amorphous semiconductor with continuous wave laser light. A semiconductor film obtained by irradiation of an amorphous semiconductor with continuous wave laser light has few crystal defects and crystal grains with large grain diameters. Accordingly, a transistor having such a semiconductor film is improved in mobility and response speed and can be driven at high speed, which is suitable for a driver IC.

Embodiment Mode 9

In this embodiment mode, a liquid crystal module formed by connecting an external circuit such as a power supply circuit or a controller to a liquid crystal display device of the present invention formed by implementing Embodiment Modes 1 to 7, which displays color images using white light, will be explained using a cross-sectional view of FIG. 12.

Figure 12:
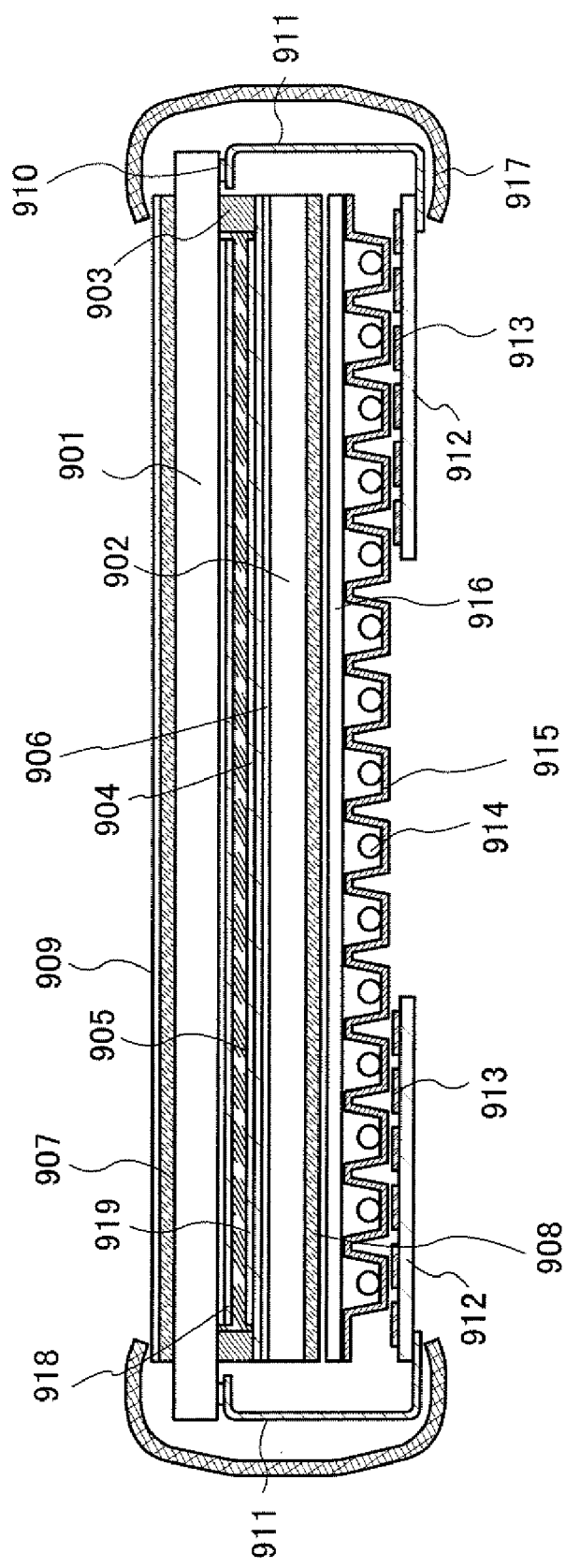
FIG. 12 shows a liquid crystal display device using the present invention.

As shown in FIG. 12, an active matrix substrate 901 and a counter substrate 902 are firmly fixed by a sealant 903, and a liquid crystal layer 905 is provided between the active matrix substrate 901 and the counter substrate 902, thereby forming a liquid crystal display panel.

A colored film 906 formed over the active matrix substrate 901 is required in order to display color images. In a case of the RGB system, a colored film corresponding to each color of red, green, and blue is provided corresponding to each pixel. Alignment films 918 and 919 are formed inside the active matrix substrate 901 and the counter substrate 902. Polarizing plates 907 and 908 are provided outside the active matrix substrate 901 and the counter substrate 902. A protective film 909 is formed over a surface of the polarizing plate 907 to reduce the external impact.

A connecting terminal 910 provided over the active matrix substrate 901 is connected to a wiring substrate 912 through an FPC 911. The wiring substrate 912 includes an external circuit 913 such as a pixel driver circuit (an IC chip, a driver IC, or the like), a control circuit, or a power supply circuit.

A back light unit includes a cold cathode tube 914, a reflecting plate 915, an optical film 916, and an inverter (not shown in the figure), which functions as a light source to emit light to the liquid crystal display panel. The liquid crystal display panel, the light source, the wiring substrate 912, the FPC 911, and the like are held and protected by a bezel 917.

Embodiment Mode 10

As electronic devices provided with a liquid crystal display device of the present invention, a television device (also simply referred to as a television or a television receiver), a digital camera, a digital video camera, a telephone device (also simply referred to as a telephone set or a telephone), an information terminal such as a PDA, an electronic book, a game machine, a monitor for computer, a computer, an audio reproducing device such as a car audio system or an MP3 player, an image reproducing device provided with a recording medium, such as a home-use game machine, and the like are given. Preferred modes thereof will be explained with reference to FIGS. 13A to 13E.

Figure 13A:
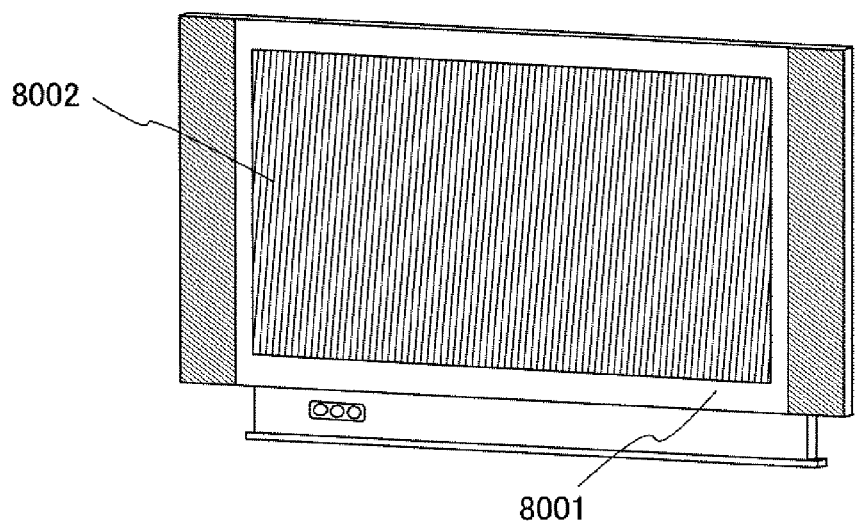
FIGS. 13A to 13E show electronic appliances provided with liquid crystal display devices using the present invention.

A television device shown in FIG. 13A includes a main body 8001, a display portion 8002, and the like. The liquid crystal display device of the present invention can be applied to the display portion 8002. The liquid crystal display device of the present invention can provide a television device capable of displaying images with high visibility.

Figure 13B:
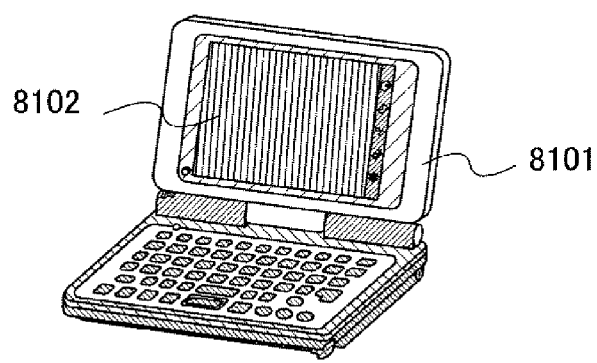

An information terminal device shown in FIG. 13B includes a main body 8101, a display portion 8102, and the like. The liquid crystal display device of the present invention can be applied to the display portion 8102. The liquid crystal display device of the present invention can provide an information terminal device capable of displaying images with high visibility.

Figure 13C:
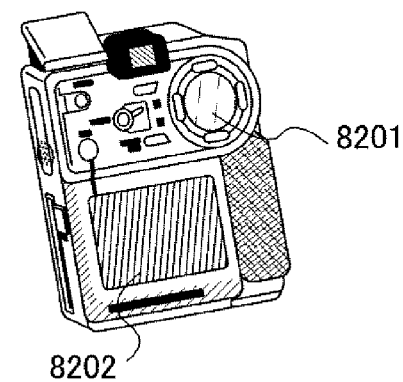

A digital video camera shown in FIG. 13C includes a main body 8201, a display portion 8202, and the like. The liquid crystal display device of the present invention can be applied to the display portion 8202. The liquid crystal display device of the present invention can provide a digital video camera capable of displaying images with high visibility.

Figure 13D:
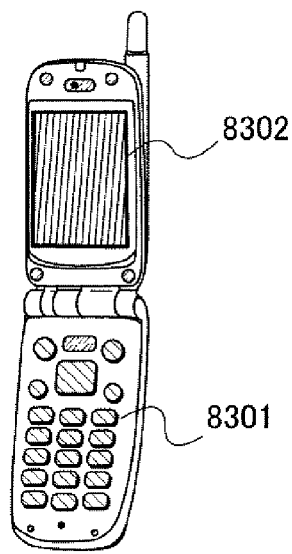

A telephone set shown in FIG. 13D includes a main body 8301, a display portion 8302, and the like. The liquid crystal display device of the present invention can be applied to the display portion 8302. The liquid crystal display device of the present invention can provide a telephone set capable of displaying images with high visibility.

Figure 13E:
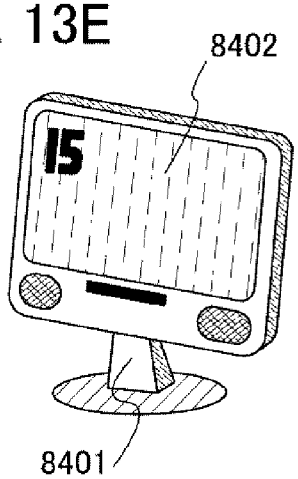

A monitor shown in FIG. 13E includes a main body 8401, a display portion 8402, and the like. The liquid crystal display device of the present invention can be applied to the display portion 8402. The liquid crystal display device of the present invention can provide a monitor capable of displaying images with high visibility.

Embodiment Mode 11

Although Embodiment Modes 1 to 10 each describes a liquid crystal display device, the present invention can be applied to a light-emitting device as well as a liquid crystal display device. When light is emitted in a contact hole portion in a light emitting device, color phase gets uneven because the contact hole portion and another portion have different lengths of optical path, through which light pass.

Figure 14:
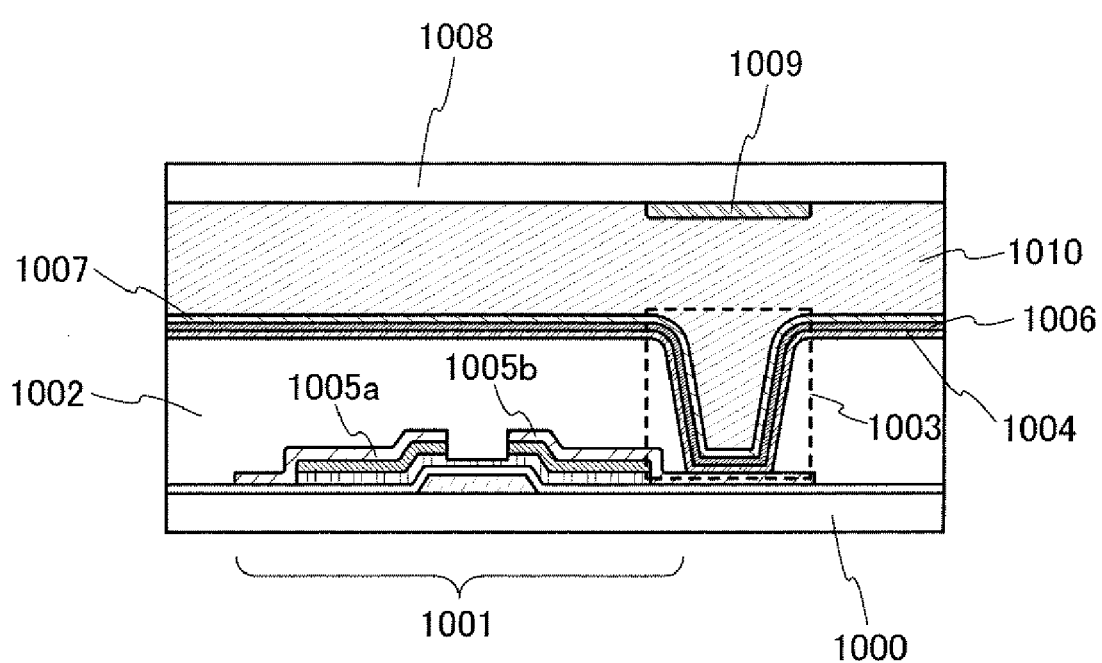
FIG. 14 is a diagram illustrating Embodiment Mode 11.

In FIG. 14, reference numeral 1000 denotes a substrate, 1001 denotes a thin film transistor, 1002 denotes an insulating film, 1003 denotes a contact hole, 1004 denotes a first electrode, 1005a denotes a source electrode, 1005b denotes a drain electrode, 1006 denotes a layer including a light-emitting layer, 1007 includes a second electrode, 1008 includes a substrate, 1009 denotes a light-shielding layer, and 1010 denotes a space.

As shown in FIG. 14, like a liquid crystal display device, an image can be displayed without color phase irregularity by forming a light-shielding layer in a region corresponding to the contact hole 1003 in the light emitting device.

Although FIG. 14 illustrates a light emitting device having the structure shown in Embodiment Mode 2, any of Embodiment Modes 1 to 5 can be applied to a light emitting device. Moreover, a light emitting device can be used for the display portion described in Embodiment Mode 10.

The present application is based on Japanese Priority application No. 2006-350137 filed on Dec. 26, 2006 with the Japanese Patent Office, the entire contents of which are hereby incorporated by reference.

What is claimed is:

1. A liquid crystal display device comprising:
    a substrate;
    a switching device provided over the substrate, the switching device comprising a channel formation region;
    a conductive layer electrically connected to the switching device;
    an insulating film having a contact hole provided over the switching device;
    a pixel electrode provided over the insulating film, wherein the pixel electrode is electrically connected to the conductive layer through the contact hole;
    a gate line;
    a source line;
    a first light-shielding layer provided with a region of a counter substrate, the region corresponding to the gate line and the source line; and
    a second light-shielding layer provided separately from the first light-shielding layer,
    wherein the second light-shielding layer does not overlap with at least a part of the channel formation region,
    wherein the second light-shielding layer is provided on the counter substrate, and
    wherein the second light-shielding layer is surrounded by the first light-shielding layer.

2. The liquid crystal display device according to claim 1, wherein the pixel electrode is provided to cover the switching device with the insulating film therebetween.

3. The liquid crystal display device according to claim 1, wherein the second light-shielding layer overlaps with the conductive layer.

4. A liquid crystal display device comprising:
    a substrate;

a switching device provided over the substrate, the switching device comprising a channel formation region;
a conductive layer electrically connected to the switching device;
an insulating film having a contact hole provided over the switching device;
a pixel electrode provided over the insulating film, wherein the pixel electrode is electrically connected to the conductive layer through the contact hole;
a gate line;
a source line;
a first light-shielding layer provided with a region of a counter substrate, the region corresponding to the gate line and the source line; and
a second light-shielding layer provided separately from the first light-shielding layer,
wherein the second light-shielding layer does not overlap with at least a part of the channel formation region,
wherein the second light-shielding layer is provided on the counter substrate, and
wherein the second light-shielding layer is provided overlapping with at least an edge of the contact hole.

5. The liquid crystal display device according to claim 4, wherein the insulating film is a planarizing film.

6. The liquid crystal display device according to claim 4, wherein the pixel electrode is provided to cover the switching device with the insulating film therebetween.

7. The liquid crystal display device according to claim 4, wherein the edge of the contact hole overlaps with the conductive layer.

8. The liquid crystal display device according to claim 4, wherein the second light-shielding layer overlaps with the conductive layer.

9. The liquid crystal display device according to claim 4, wherein each the edge of the contact hole and the second light-shielding layer overlap with the conductive layer.

10. The liquid crystal display device according to claim 1, wherein the insulating film is a planarizing film.

11. A liquid crystal display device comprising:
a substrate;
a switching device provided over the substrate;
a conductive layer electrically connected to the switching device;
an insulating film having a contact hole provided over the switching device;
a pixel electrode provided over the insulating film; and
an island-like colored layer, an opening portion being provided in the island-like colored layer,
wherein the pixel electrode is electrically connected to the conductive layer through the contact hole,
wherein the island-like colored layer is provided on a counter substrate, and
wherein the opening portion in the island-like colored layer is provided overlapping with at least an edge of the contact hole.

12. The liquid crystal display device according to claim 11, wherein the pixel electrode is provided to cover the switching device with the insulating film therebetween.

13. The liquid crystal display device according to claim 11, wherein the edge of the contact hole overlaps with the conductive layer.

14. The liquid crystal display device according to claim 11, wherein the opening portion in the island-like colored layer overlaps with the conductive layer.

15. The liquid crystal display device according to claim 11, wherein each the edge of the contact hole and the opening portion in the island-like colored layer overlap with the conductive layer.

16. The liquid crystal display device according to claim 11, wherein the insulating film is a planarizing film.

17. A liquid crystal display device comprising:
a substrate;
a switching device provided over the substrate, the switching device comprising a channel formation region;
a conductive layer electrically connected to the switching device;
an insulating film having a contact hole provided over the switching device;
a pixel electrode provided over the insulating film, wherein the pixel electrode is electrically connected to the conductive layer through the contact hole;
a colored layer having an opening portion;
a gate line;
a source line;
a first light-shielding layer provided with a region of a counter substrate, the region corresponding to the gate line and the source line; and
a second light-shielding layer provided separately from the first light-shielding layer,
wherein the second light-shielding layer does not overlap with at least a part of the channel formation region,
wherein the second light-shielding layer is provided on the counter substrate, and
wherein the second light-shielding layer is surrounded by the first light-shielding layer.

18. The liquid crystal display device according to claim 17, wherein the pixel electrode is provided to cover the switching device with the insulating film therebetween.

19. The liquid crystal display device according to claim 17, wherein the second light-shielding layer overlaps with the conductive layer.

20. The liquid crystal display device according to claim 17, wherein the opening portion in the colored layer overlaps with the conductive layer.

21. The liquid crystal display device according to claim 17, wherein the insulating film is a planarizing film.

22. A liquid crystal display device comprising:
a substrate;
a switching device provided over the substrate;
a conductive layer electrically connected to the switching device;
an insulating film having a contact hole provided over the switching device;
a pixel electrode provided over the insulating film, wherein the pixel electrode is electrically connected to the conductive layer through the contact hole;
a gate line;
a source line;
a first light-shielding layer provided with a region of a counter substrate, the region corresponding to the gate line and the source line;
a second light-shielding layer provided separately from the first light-shielding layer; and
an island-like colored layer, an opening portion being provided in the island-like colored layer,
wherein the second light-shielding layer is provided on the counter substrate, and
wherein the opening portion in the island-like colored layer is provided overlapping with at least an edge of the contact hole.

23. The liquid crystal display device according to claim 22, wherein the pixel electrode is provided to cover the switching device with the insulating film therebetween.

24. The liquid crystal display device according to claim 22, wherein the edge of the contact hole overlaps with the conductive layer.

25. The liquid crystal display device according to claim 22, wherein the second light-shielding layer overlaps with the conductive layer.

26. The liquid crystal display device according to claim 22, wherein the opening portion in the island-like colored layer overlaps with the conductive layer.

27. The liquid crystal display device according to claim 22, wherein each the edge of the contact hole and the second light-shielding layer overlap with the conductive layer.

28. The liquid crystal display device according to claim 22, wherein each the edge of the contact hole and the opening portion in the island-like colored layer overlap with the conductive layer.

29. The liquid crystal display device according to claim 22, wherein the insulating film is a planarizing film.

30. A liquid crystal display device comprising:
a substrate;
a switching device provided over the substrate, the switching device comprising a channel formation region;
a conductive layer electrically connected to the switching device;
an insulating film having a contact hole provided over the switching device;
a pixel electrode provided over the insulating film, wherein the pixel electrode is electrically connected to the conductive layer through the contact hole;
a colored layer having an opening portion;
a gate line;
a source line;
a first light-shielding layer provided with a region of a counter substrate, the region corresponding to the gate line and the source line; and
a second light-shielding layer provided separately from the first light-shielding layer,
wherein the second light-shielding layer is provided on the counter substrate,
wherein the second light-shielding layer does not overlap with at least a part of the channel formation region, and
wherein the second light-shielding layer is provided overlapping with at least an edge of the contact hole.

31. The liquid crystal display device according to claim 30, wherein the pixel electrode is provided to cover the switching device with the insulating film therebetween.

32. The liquid crystal display device according to claim 30, wherein the edge of the contact hole overlaps with the conductive layer.

33. The liquid crystal display device according to claim 30, wherein the second light-shielding layer overlaps with the conductive layer.

34. The liquid crystal display device according to claim 30, wherein the opening portion in the colored layer overlaps with the conductive layer.

35. The liquid crystal display device according to claim 30, wherein each the edge of the contact hole and the second light-shielding layer overlap with the conductive layer.

36. The liquid crystal display device according to claim 30, wherein each the edge of the contact hole and the opening portion in the island-like colored layer overlap with the conductive layer.

37. The liquid crystal display device according to claim 30, wherein the insulating film is a planarizing film.

38. A liquid crystal display device comprising:
a substrate;
a switching device provided over the substrate;
a conductive layer electrically connected to the switching device;
an insulating film having a contact hole provided over the switching device;
a pixel electrode provided over the insulating film, wherein the pixel electrode is electrically connected to the conductive layer through the contact hole;
a gate line;
a source line;
a first light-shielding layer provided with a region of a counter substrate, the region corresponding to the gate line and the source line;
a second light-shielding layer provided separately from the first light-shielding layer; and
an island-like colored layer, an opening portion being provided in the island-like colored layer,
wherein the second light-shielding layer is provided on the counter substrate,
wherein the second light-shielding layer is provided overlapping with at least an edge of the contact hole, and
wherein the opening portion in the island-like colored layer is provided overlapping with at least the edge of the contact hole.

39. The liquid crystal display device according to claim 38, wherein the pixel electrode is provided to cover the switching device with the insulating film therebetween.

40. The liquid crystal display device according to claim 38, wherein the edge of the contact hole overlaps with the conductive layer.

41. The liquid crystal display device according to claim 38, wherein the second light-shielding layer overlaps with the conductive layer.

42. The liquid crystal display device according to claim 38, wherein the opening portion in the island-like colored layer overlaps with the conductive layer.

43. The liquid crystal display device according to claim 38, wherein each the edge of the contact hole and the second light-shielding layer overlap with the conductive layer.

44. The liquid crystal display device according to claim 38, wherein each the edge of the contact hole and the opening portion in the island-like colored layer overlap with the conductive layer.

45. The liquid crystal display device according to claim 38, wherein the insulating film is a planarizing film.

* * * * *

UNITED STATES PATENT AND TRADEMARK OFFICE
CERTIFICATE OF CORRECTION

PATENT NO. : 8,164,718 B2
APPLICATION NO. : 11/955602
DATED : April 24, 2012
INVENTOR(S) : Saishi Fujikawa et al.

It is certified that error appears in the above-identified patent and that said Letters Patent is hereby corrected as shown below:

Col. 15, line 58, "described in FIG. 5" should read "described in FIG. 5B"

Col. 18, line 19, "and 5B can be combined" should read "and 4B can be combined"

Col. 18, line 20, "FIG. 5B illustrates" should read "FIG. 4B illustrates"

Col. 18, line 55, "FIGS. 5A to 8F." should read "FIGS. 8A to 8F."

Col. 19, line 53, "(FIG. 5B)." should read "(FIG. 8B)."

Col. 19, line 56, "(FIGS. 5C to 5D)." should read "(FIGS. 8C to 8D)."

Signed and Sealed this
Twenty-first Day of August, 2012

David J. Kappos
*Director of the United States Patent and Trademark Office*